United States Patent
Natsuno et al.

(10) Patent No.: US 7,269,445 B2
(45) Date of Patent: Sep. 11, 2007

(54) METHOD AND APPARATUS FOR DELIVERING PROGRAM TO STORAGE MODULE OF MOBILE TERMINAL

(75) Inventors: Takeshi Natsuno, Tokyo (JP); Takatoshi Itagaki, Tokyo (JP); Atsushi Moriguchi, Tokyo (JP)

(73) Assignee: NTT DoCoMo Inc., Tokyo (JP)

( * ) Notice: Subject to any disclaimer, the term of this patent is extended or adjusted under 35 U.S.C. 154(b) by 811 days.

(21) Appl. No.: 10/149,278

(22) PCT Filed: Jan. 30, 2002

(86) PCT No.: PCT/JP02/00699

§ 371 (c)(1),
(2), (4) Date: Jun. 5, 2002

(87) PCT Pub. No.: WO02/061572

PCT Pub. Date: Aug. 8, 2002

(65) Prior Publication Data

US 2002/0194474 A1 Dec. 19, 2002

(30) Foreign Application Priority Data

Jan. 31, 2001 (JP) ............................. 2001-024738
Mar. 22, 2001 (JP) ............................. 2001-083567

(51) Int. Cl.
*H04Q 7/20* (2006.01)
(52) U.S. Cl. ................... 455/558; 455/411; 455/419
(58) Field of Classification Search ................ 380/278; 455/558, 411, 418, 419; 705/26
See application file for complete search history.

(56) References Cited

U.S. PATENT DOCUMENTS 5,887,254 A * 3/1999 Halonen .................... 455/419

(Continued)

FOREIGN PATENT DOCUMENTS

EP 0 778 522 A2 11/1997

(Continued)

OTHER PUBLICATIONS

Kajiura, M., Goto, T., Takahashi, T., Akiyama, K., "SPAgent—A Security Module Adaptable for EC Systems," Information Processing Society of Japan Research Report (99-DPS-94-5), Information Processing Society of Japan, Jul. 16, 1999, vol. 99, No. 56, pp. 25-30 (CS-NG-2001-00271-005).

*Primary Examiner*—Temica Beamer
(74) *Attorney, Agent, or Firm*—Brinks Hofer Gilson & Lione

(57) ABSTRACT

A user identification module (UIM) 12 having a plurality of storage areas that may be built into or mounted in a mobile terminal 11. A contents server 19, upon receipt of a distribution request from the mobile terminal 11, may distribute a program or data used at the time of program execution through a network including a radio network. The program may be encrypted twice by the contents server 19. During distribution, the program may be decrypted a first time by a distribution management server 16. The program may be decrypted a second time by the UIM 12. The decrypted program and the data may be stored in one of a plurality of separate and independently operated memory blocks of the UIM 12 and not through the control unit of the mobile terminal 11. The program may be enabled for execution by the UIM 12 at the direction of the distribution management server 16.

22 Claims, 32 Drawing Sheets

U.S. PATENT DOCUMENTS

| | | |
|---|---|---|
| 5,935,243 A | 8/1999 | Hasebe et al. |
| 6,023,620 A * | 2/2000 | Hansson ..................... 455/419 |
| 6,714,649 B1 | 3/2004 | Masuda et al. ............... 380/44 |
| 6,885,877 B1 | 4/2005 | Ozaki et al. |
| 2006/0073811 A1* | 4/2006 | Ekberg ....................... 455/411 |

FOREIGN PATENT DOCUMENTS

| | | |
|---|---|---|
| EP | 0 813 132 A2 | 12/1997 |
| EP | 0 813 133 A2 | 12/1997 |
| EP | 0 875 815 A2 | 11/1998 |
| EP | 0 996 074 A1 | 4/2000 |
| JP | H2-122330 | 10/1990 |
| JP | 6-195217 | 7/1994 |
| JP | H8-249312 | 9/1996 |
| JP | H09-069044 A | 3/1997 |
| JP | H9-244900 | 9/1997 |
| JP | 10-78867 | 3/1998 |
| JP | 11-170752 | 6/1999 |
| JP | 11-338946 | 12/1999 |
| JP | 2000-293584 | 10/2000 |
| JP | 2001-28786 | 1/2001 |
| JP | 2001-043175 | 2/2001 |
| JP | 2001-117885 | 4/2001 |
| KR | 2000-11441 | 2/2000 |
| WO | WO 00/42498 | 7/2000 |

* cited by examiner

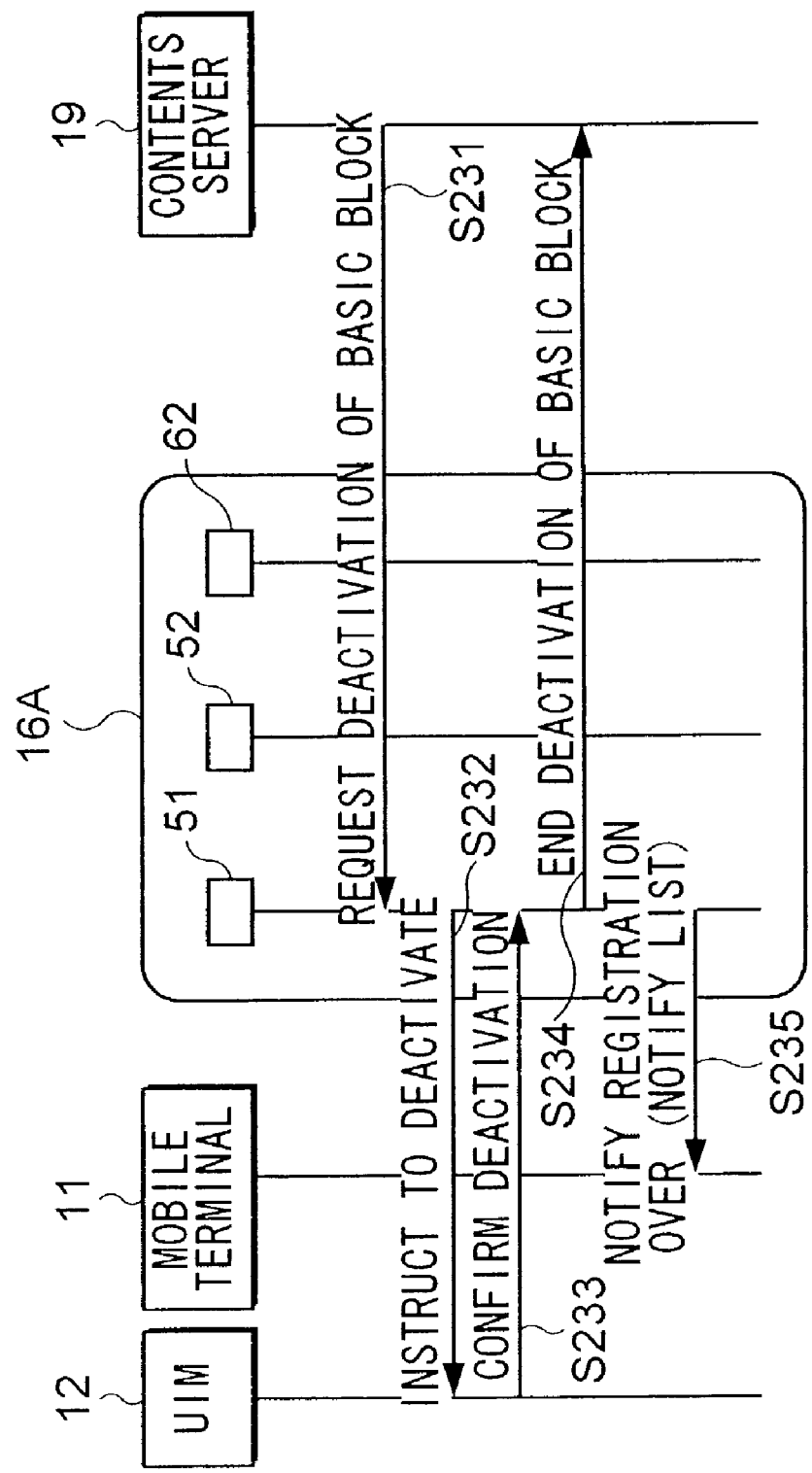

METHOD AND APPARATUS FOR DELIVERING PROGRAM TO STORAGE MODULE OF MOBILE TERMINAL

TECHNICAL FIELD

The present invention relates to a system for distributing a program to a storage module built or mounted in a mobile terminal.

BACKGROUND ART

In recent years, a mobile terminal has been developed that has a program executing environment. An example of a mobile terminal of this type is one that has a Java virtual machine. The user installs a program in the mobile terminal, and thus can add a desired function to the mobile terminal.

However, even if desirable functions are added to a mobile terminal, a user is likely to become tired of using the same mobile terminal after a protracted period of time. On the other hand, the mobile terminal industry experiences fierce competition and various new products that are attractive to users have been successively placed on the market. A user may want to replace his mobile terminal with a new desirable product that has been placed on the market. Once the mobile terminal is replaced, however, the functions that have been previously added to the old mobile terminal cannot be used any longer. If the same functions are to be used even after replacement of a mobile terminal, the programs that have been installed in the old mobile terminal have to be installed in the new mobile terminal. This may be difficult.

SUMMARY

In view of the situation described above, a system is provided in which even after a mobile terminal is replaced with a different mobile terminal, the programs that could be used before replacement of the mobile terminal, can be continuously used after the change.

A mobile terminal may include a module capable of storing subscriber information (hereinafter referred to as the user ID module or UIM). The subscriber information may include a subscriber number and memory dial information. The UIM may be fitted within or mounted on the mobile terminal. A user of this type of mobile terminal, whenever desirous of replacing the mobile terminal with a new mobile terminal, can use the new mobile terminal in a similar manner. The new mobile terminal can be used in a similar manner simply by mounting or building into the new mobile terminal the UIM of the old mobile terminal.

Once a program is stored in the UIM, a program used with the old mobile terminal can be easily transferred to the new mobile terminal for improved operating convenience of the user. Nevertheless, the issue of security has been a consideration with such a mobile terminal. If no limit is set on the operation of writing a program in the UIM, the inherent functions of the mobile terminal may be destroyed intentionally or negligently. Also, the subscriber information stored in the UIM may include personal information of the user and/or data owned by the user that has monetary value. From the viewpoint of security, therefore, careful consideration is necessary to avoid unauthorized distribution of this information when writing a program in the UIM.

In order to solve security issue(s) and improve the operating convenience for the user, there is provided a program distribution system. The program distribution system comprises a mobile terminal having means for transmitting a program distribution request. The mobile terminal also includes a storage module that is built in or connected to the mobile terminal. In addition, the program distribution system may also include a contents server for receiving a distribution request and transmitting a program to be distributed. The program distribution system may include a distribution management server for receiving the program from the contents server. When the contents server is authorized, the distribution management server may transmit a program received from the contents server to the storage module built in or connected with the mobile terminal.

The storage module may include a storage unit and a control unit. The storage unit and the control unit may be used for storing a program received by the mobile terminal from the distribution management server. In addition, the control unit may execute a program stored in the storage unit in response to a request.

There is also provided a program distribution system comprising a mobile terminal. The program distribution system may have means for transmitting a program distribution request, a storage module built in or connected to the mobile terminal, and a distribution management server for receiving the distribution request. A program to be distributed may be provided by an authorized contents server. The authorized contents server may acquire and transmit the program to the storage module that is built in or connected to the mobile terminal. The storage module includes a storage unit, and a control unit for receiving information through the mobile terminal. Information stored in the storage unit may be a program received from the distribution management server. Programs stored in the storage unit may be executed in response to a request. Only a program supplied through the distribution management server from an authorized contents server may be written in the storage module. Thus, the user can write a new program in the storage module with guaranteed security.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 32 is a sequence diagram showing the deactivation process for the basic blocks of a UIM in the program distribution system illustrated in FIG. 21.

DETAILED DESCRIPTION OF THE PRESENTLY PREFERRED EMBODIMENTS

[1] First Embodiment

[1.1] General Configuration of an Example Program Distribution System

Figure 1:
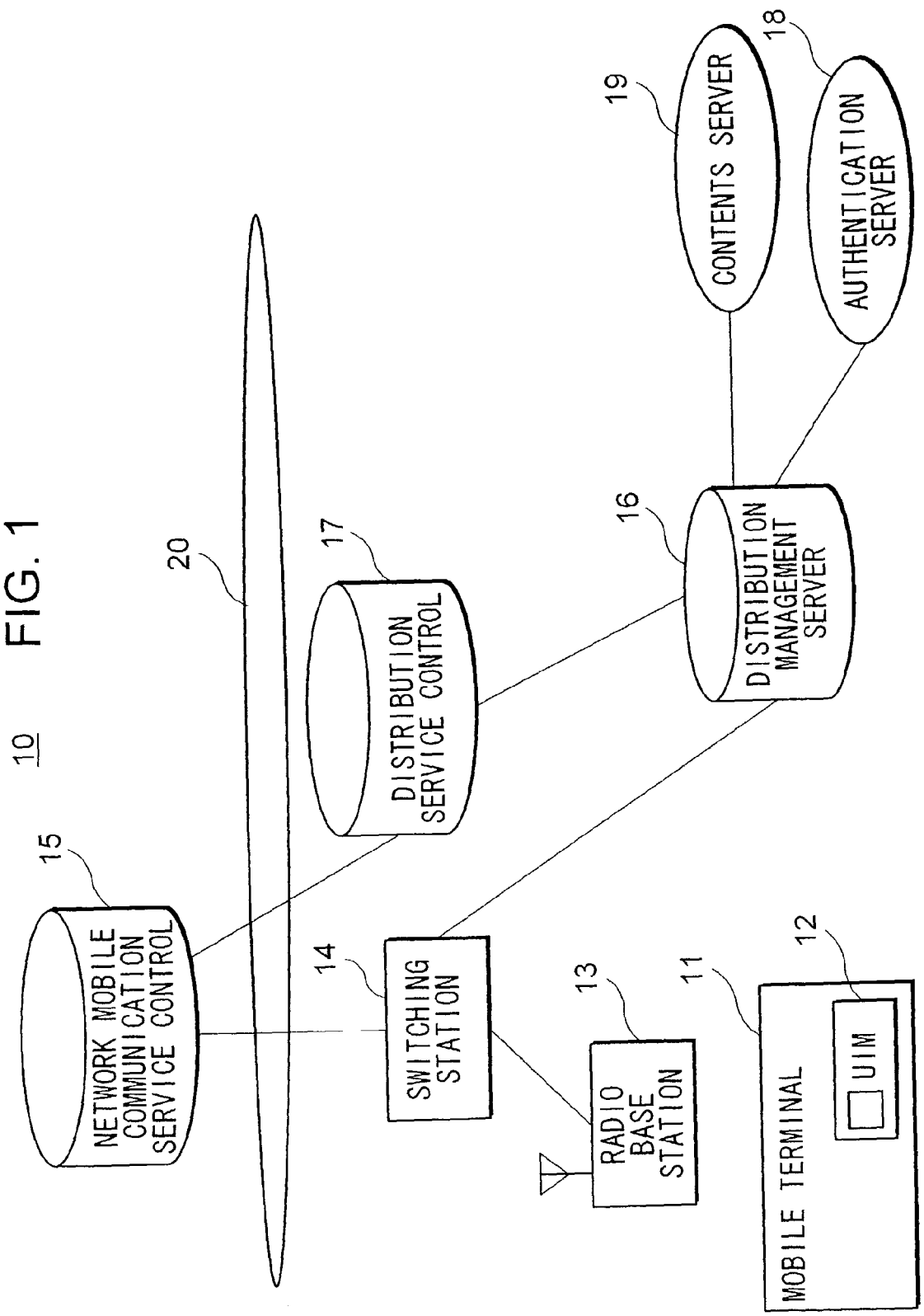
FIG. 1 is a block diagram showing a configuration of a program distribution system according to a first embodiment.

FIG. 1 is a block diagram showing an example configuration of a program distribution system 10. The illustrated program distribution system 10 comprises a mobile terminal 11, a radio base station 13, a switching station 14, a network mobile communication service control unit 15, a distribution management server 16, a distribution service control unit 17, an authentication server 18, a contents server 19 and a public network 20.

The mobile terminal 11 is an information processing unit, for example, having communication functions such as a portable telephone or a PHS (Personal Handyphone System (registered trade name)). Further, the mobile terminal 11 may include a User Identification Module (UIM) 12. The UIM 12 may be mounted on and/or built into the mobile terminal 11, and is capable of storing various programs and/or data.

The radio base station 13 may communicate with the mobile terminal 11 through a radio link. The switching station 14 may control a switching operation between the mobile terminal 11 and the public network 20. The public network 20 may be a common channel interface signal network that includes a wire network. The mobile terminal 11 may be connected with the switching station 14 through the radio base station 13.

The network mobile communication service control unit 15 may control the communication when a program is distributed to the mobile terminal 11 through the public network 20. The contents server 19 may be operated by a contents provider to distribute various programs. In addition, the contents server 19 may distribute a program based on a request from the mobile terminal 11.

The distribution management server 16 may relay and manage the distribution of a program from the contents server 19 to the UIM 12. The distribution of a program to the UIM 12, and access to a program stored in the UIM 12, may be performed through the distribution management server 16. The distribution service control unit 17 may provide an interface between the distribution management server 16 and the public network 20 when a program is distributed through the public network 20. The authentication server 18 is a device for issuing a certificate. The certificate may be required for programs distributed from the contents server 19. The certificate may include a UIM public key to certify to the UIM 12 that the contents server 19 is duly authorized to distribute a program to the UIM 12. In addition, the certificate may include a distribution management server public key to certify to the distribution management server 16 that the contents server 19 is similarly authorized.

During operation, the contents server 19 may send a program addressed to the UIM 12 to the distribution management server 16. The distribution management server 16 may in turn distribute the program to the mobile terminal 11 that includes the UIM 12 identified by the address. Alternatively, the contents server 19 may distribute the program to the UIM 12 by encrypted communication using a publickey type with the distribution management server 16 as an intermediary. The UIM 12 of each user may be equipped with a PKI (public key infrastructure). Accordingly, each UIM 12 may have a UIM private key unique to the particular UIM 12. The contents server 19 may acquire a UIM public key that is paired with a UIM private key for a particular UIM 12. The contents server 19 may then encrypt the program using the UIM public key, and distribute the encrypted program to the UIM 12 via the distribution management server 16.

In another alternative, only an authorized contents server 19 can distribute a program addressed to the UIM 12. The authorized contents server 19 may be assigned a distribution management server public key. The contents server 19, upon receipt of a distribution request from the mobile terminal 11, may further encrypt the program already encrypted by the UIM public key and addressed to the UIM 12. The program may be further encrypted using the distribution management server public key. The twice encrypted program may then be sent by the contents server 19 to the distribution management server 16.

[1.2] Configuration of Mobile Terminal

Figure 2:
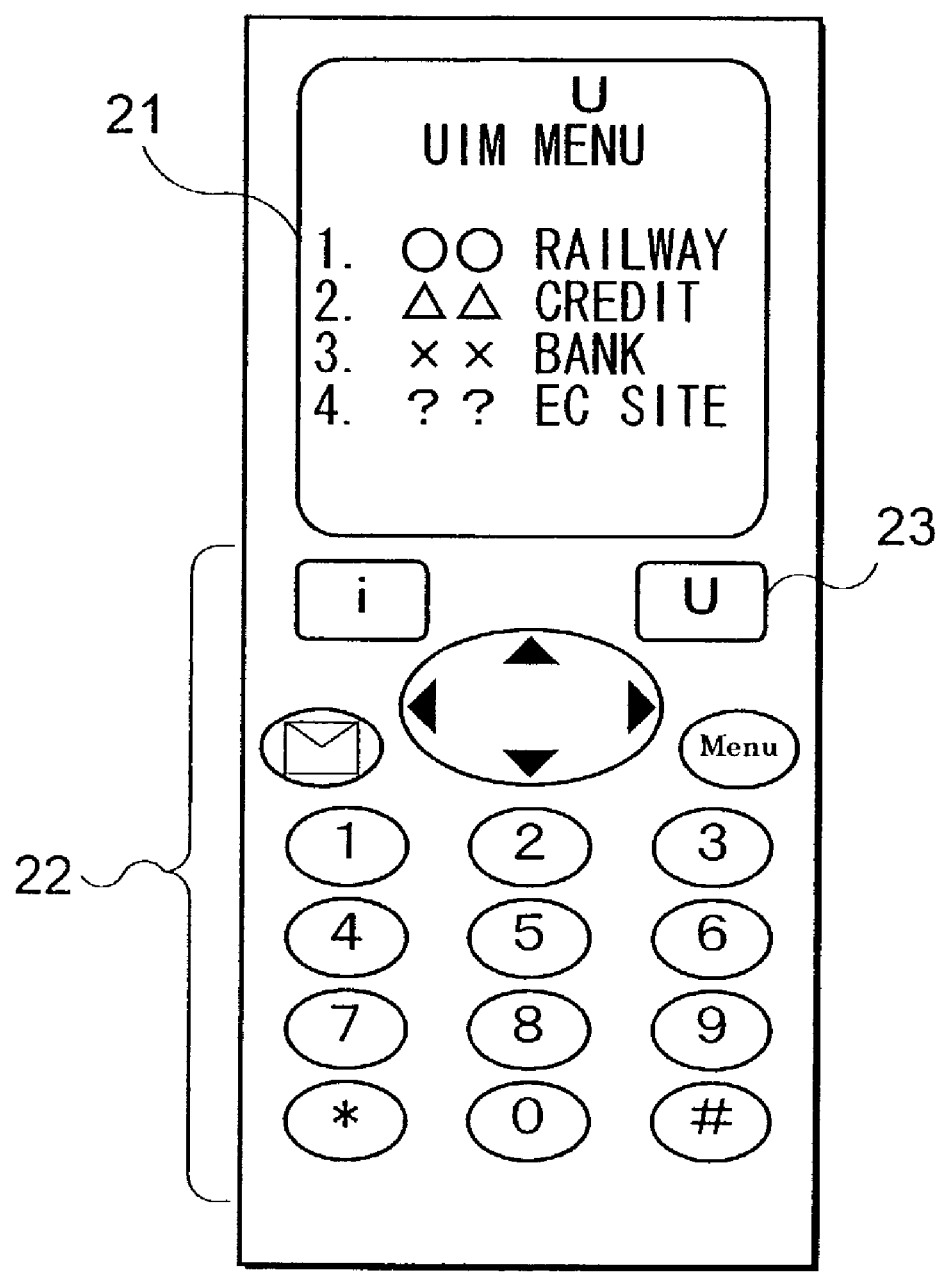
FIG. 2 shows the external appearance of a mobile terminal illustrated in FIG. 1.

FIG. 2 shows an example of the external appearance of the mobile terminal 11. The illustrated mobile terminal 11 includes a display section 21 and an operating section 22. As shown in FIG. 2, various processing menu items, such as a screen being browsed, a telephone number screen, etc. may be displayed on the display section 21. The operating section 22 includes a plurality of operating buttons for inputting various data and displaying menu item screens. One of the operating buttons of the operating unit 22 may be a UIM button 23. The UIM button 23 may be operated by the user to utilize a program stored in the UIM 12.

Figure 3:
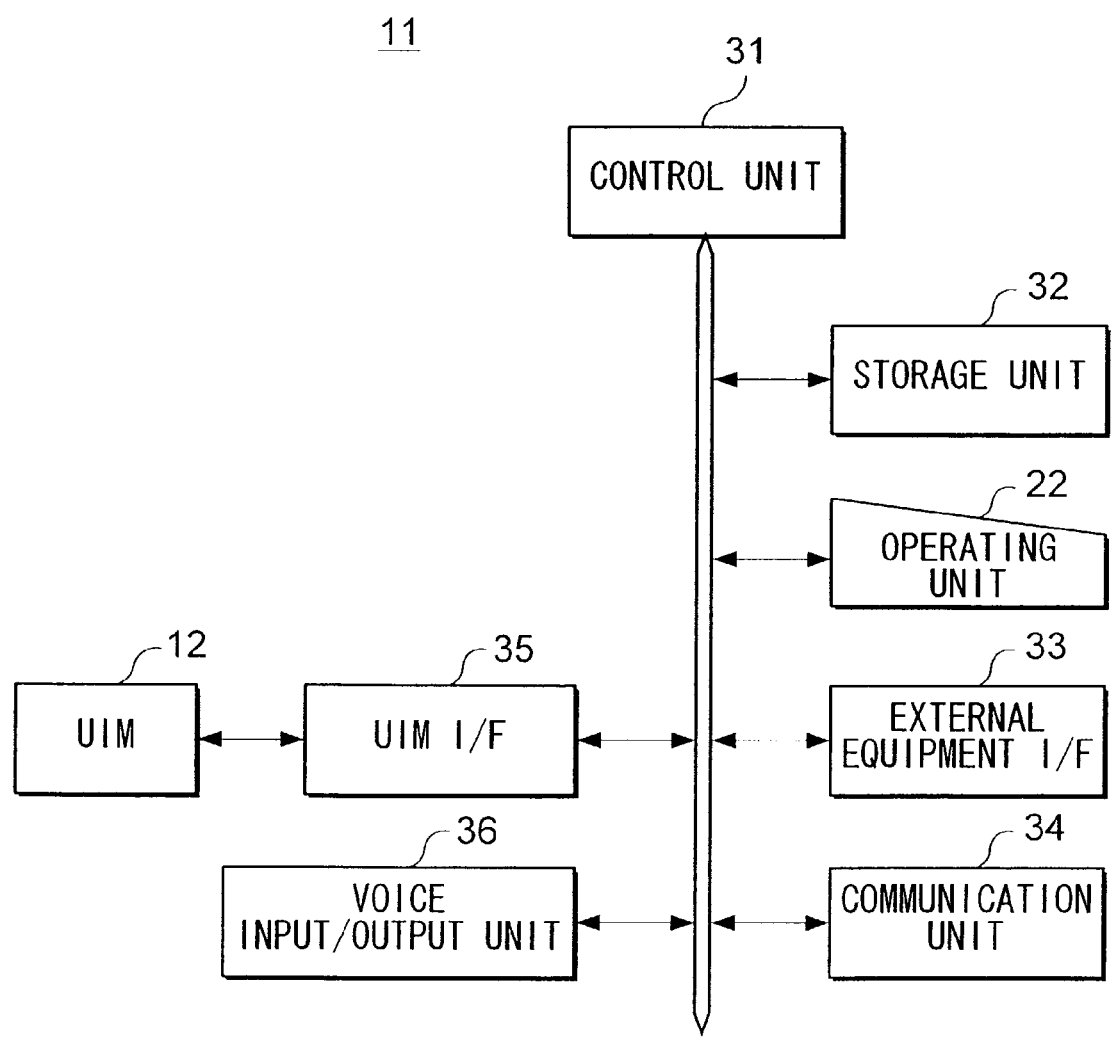
FIG. 3 is a block diagram showing a configuration of the mobile terminal of FIG. 2.

FIG. 3 is a block diagram showing an example configuration of a mobile terminal 11. The mobile terminal 11 includes a display unit 21, an operating unit 22, a control unit 31, a storage unit 32, an external equipment interface (I/F) unit 33, a communication unit 34, a UIM interface (I/F) unit 35 and a voice input/output unit 36.

The control unit 31 may control the various parts of the mobile terminal 11 based on control data and a control program stored in the storage unit 32. The storage unit 32 may be a memory drive configured as a ROM, a RAM, etc. that has a plurality of storage areas. The storage areas may include a program storage area for storing various programs, such as a browser for accessing the Internet, and a data storage area for storing various data.

The external equipment I/F unit 33 may be an interface utilized by the control unit 31 and the UIM 12 for exchanging information with an external device.

The communication unit 34 may transmit various data including audio and text messages to the radio base station 13 (FIG. 1) through an antenna 34A. Transmission of data may be performed under the control of the control unit 31. The communication unit 34 may also receive various data sent to the mobile terminal 11 through the antenna 34A.

The UIM I/F unit 35 may input/output data from and to the control unit 31. In addition, the UIM I/F unit 35 may relay output data from the communication unit 34 or the external equipment I/F unit 33 to the UIM 12 without intermediation of the control unit 31. Also, the output data of the UIM 12 may be output directly to the external equipment I/F unit 33 or the communication unit 34 without intermediation of the control unit 31. The data may be input/output directly from and to the external equipment I/F 33 and/or the communication unit 34 without the intermediation of the control unit 31 to prevent unauthorized access to the data in the UIM 12 by, for example, alteration of the control program of the control unit 31. Thus, security of the data in the UIM 12 is maintained.

[1.3] Configuration of UIM

Figure 4:
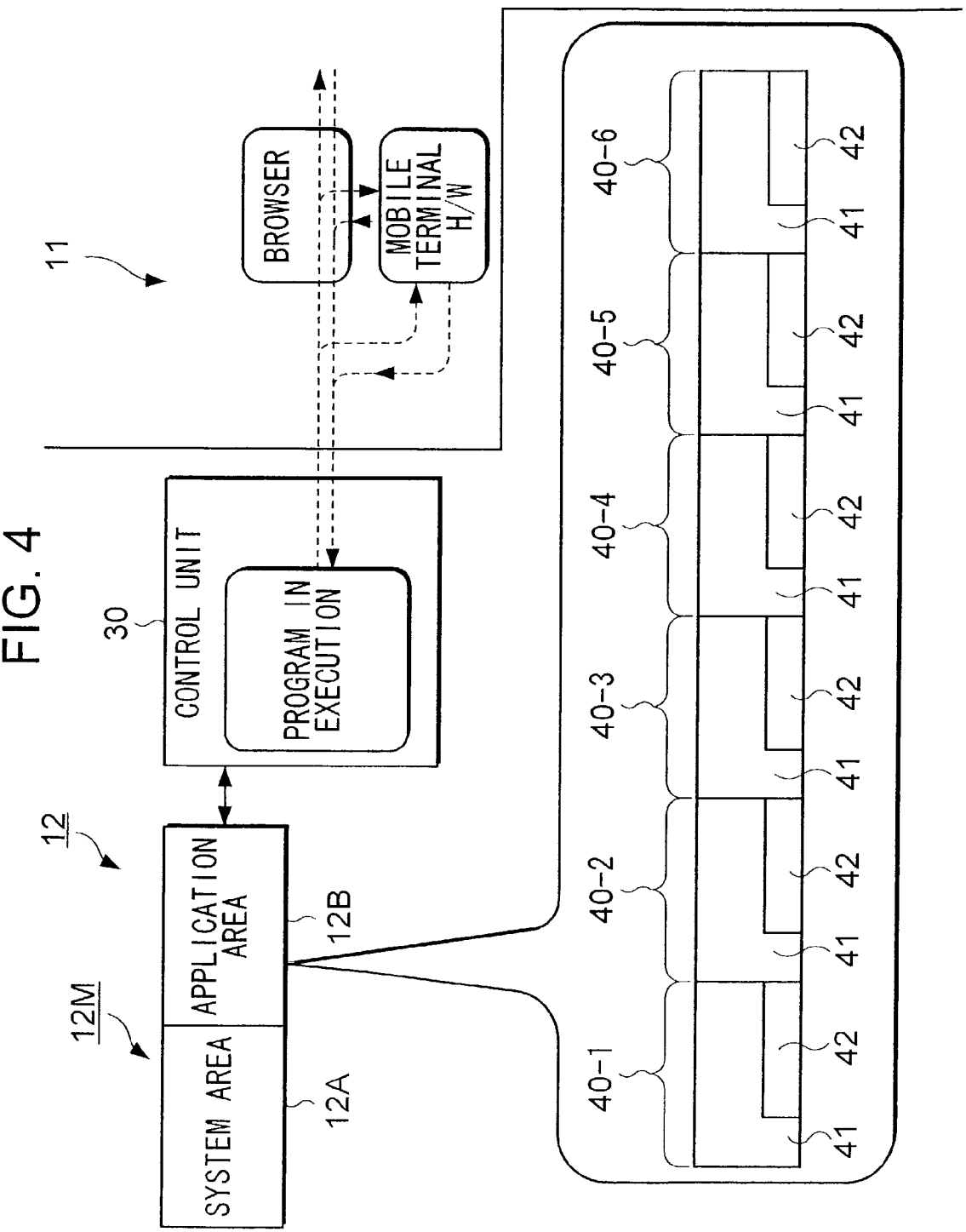
FIG. 4 is a diagram showing a configuration of a portion of the mobile terminal of FIG. 3 and the UIM built in or connected to the mobile terminal.

FIG. 4 shows an example configuration of the UIM 12 illustrated in FIG. 3. In FIG. 4, a portion of the component elements of the mobile terminal 11 are shown together with the component elements of the UIM 12 to clarify the relationship with the mobile terminal 11. As shown in FIG. 4, the UIM 12 includes a memory 12M and a control unit 30. The memory 12M may generally include a system area 12A and an application area 12B.

The system area 12A may store personal information data unique to each user, such as subscriber number data, outgoing call history information data, incoming call history information data, speech time information data and a UIM private key. The mobile terminal 11 may communicate with other communication units using the subscriber number data as a calling line identity.

The application area 12B may store one or more programs distributed to the mobile terminal 11, and the corresponding data used at the time of execution of each of the programs. The programs and corresponding data may be divided into a plurality of basic blocks 40. In the example shown in FIG. 4, the application area 12B is divided into six basic blocks 40 identified as blocks 40-1 to 40-6. The basic blocks 40-1 to 40-6 may each include a program area 41 and a data area 42. The program area 41 of each basic block 40-$k$ (where "k" is any of 1 through 6) may store a program, such as an application or an applet. The data area 42 of each basic block 40-$k$, on the other hand, may store data used at the time of execution of the program stored in the program area 41 of the same basic block 40-$k$.

The basic blocks 40-1 to 40-6 may be independent of each other. As such, each of the basic blocks 40-1 to 40-6 may be managed so that the program stored in the program area 41 of a first basic block 40 cannot freely access the data area 42 of a second basic block 40. By employing this configuration, the security of each program and corresponding data may be maintained. For example, data having a monetary value (what is hereinafter called "value data") may be recorded in the data area 42 of a first basic block 40. The particular data may therefore not be rewritten, intentionally or incidentally, by a program stored in a second basic block 40. A program stored in the program area 41 may also not be distributed or deleted without the intermediary of the distribution management server 16. The data area 42, however, can be operated directly through the distribution management server 16 or a local terminal, such as, for example, where electronic money is downloaded from an ATM.

The application area 12B may also include a storage area for an activation flag. The activation flag may indicate whether the program in the program area 41 of each of the basic blocks 40-1 to 40-6 can be executed. The control unit 30 may be a means for writing a program for the basic block of the application area 12B. In addition, the control unit 30 may set or reset the activation flag corresponding to each basic block. The control unit 30 may also execute a program in a designated basic block in response to a request given through the mobile terminal 11.

Referring now to FIGS. 1, 3 and 4, during operation, a program encrypted by the UIM public key may be received by the mobile terminal 11 from the distribution management server 16. The control unit 30 may decrypt the program using the UIM private key stored in the system area 12A. In addition, the program may be written (stored) into a basic block 40, such as basic block 40-1 by the control unit 30. The control unit 30 may also execute the program in the basic block 40.

Any information that may be required by the executed program may be acquired from another party in communication with the mobile terminal 11 over the public network 20 (FIG. 1). Alternatively, the information may be acquired by the user of the mobile terminal 11 through a browser executed by the mobile terminal 11. The control unit 30 can also send the results of program execution to another party in communication with the mobile terminal 11 over the public network 20, and/or send the results to the user of the mobile terminal 11 through a browser executed by the mobile terminal 11.

The control unit 30 may also exchange information with external devices using the hardware resources of the mobile terminal 11. Information may be exchanged without the intermediary of a browser in accordance with the functionality of a program stored in the basic block. An example program with this type of functionality allows the mobile terminal 11 to function as a commutation pass. In executing this program, the control unit 30 can exchange pass information with a card reader/writer at the gates of a railway station. The pass information may be exchanged utilizing, for example, a short-range radio unit (not shown) connected to the external equipment I/F 33 of the mobile terminal 11. The instructions executed by the control unit 30 to perform the various previously described processes, including the execution and control of the program in the application area 12B, may be stored in the system area 12A.

[1.4] Operation of First Embodiment

Example operation of the first embodiment illustrated in FIG. 1 will now be explained during distribution of a program to a mobile terminal 11. For purposes of example only, the previously discussed commutation pass program will be discussed.

Figure 5:
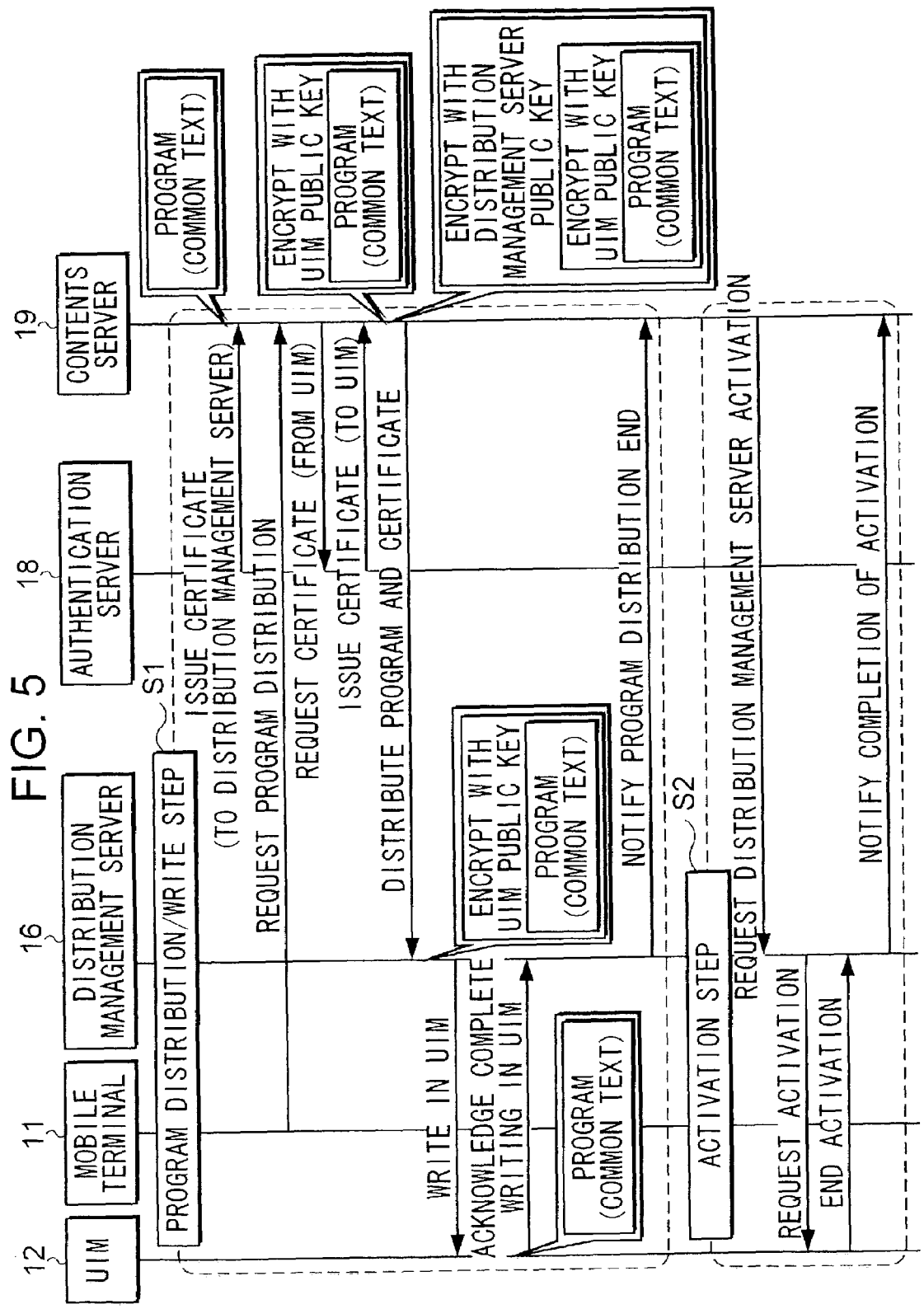
FIG. 5 is a sequence diagram showing the process from program distribution to activation in the program distribution system of FIG. 1.

FIG. 5 is a sequence diagram showing an example of the processes of distribution of a program, a write operation of the program and activation of the program. As shown in FIG. 5, the illustrated processes may generally be described as distributing an inactive program to the UIM 12, writing the inactive program in the UIM 12 (step S1), and activating the program written into the UIM (step S2). These processes will be described in detail hereafter.

[1.4.1] Issue of Certificate to Distribution Management Server

Figure 6:
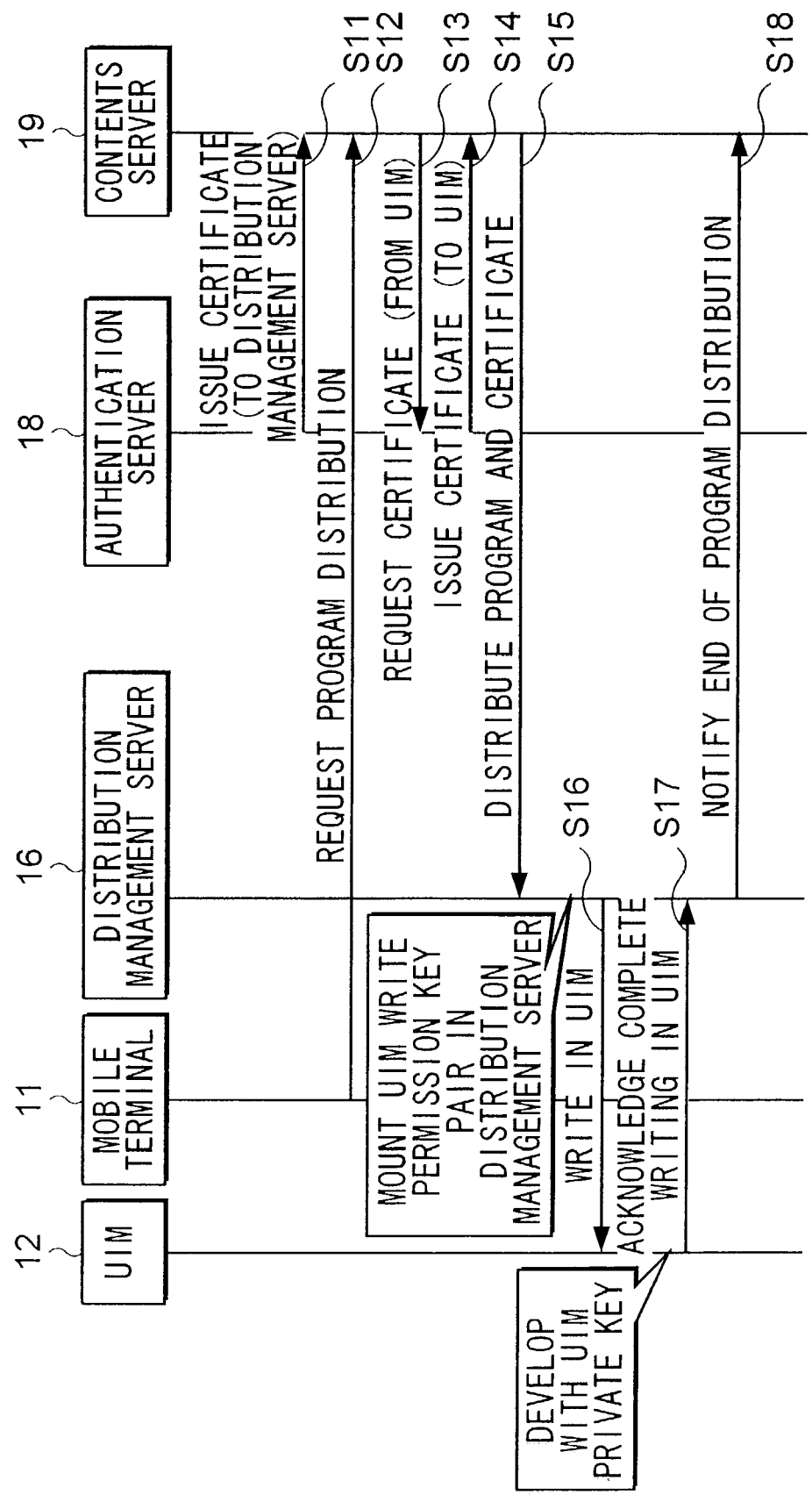
FIG. 6 is a sequence diagram showing the program distribution operation in the program distribution system of FIG. 1.

FIG. 6 is a sequence diagram showing an example of the process of distributing a program and writing the program into the UIM 12. As shown in FIG. 6, the authentication server 18 may issue a certificate to the contents server 19 (step S11). The certificate may be issued to permit the contents server 19 to distribute a program addressed to the UIM 12. In addition, the certificate may be issued to enable the contents server 19 and the distribution management server 16 to perform encrypted communication based on a public key encryption method.

Specifically, to perform encrypted communication, a distribution management server private key and a distribution management server public key, constituting a pair, may be generated. The distribution management server private key may be stored in the distribution management server 16. The distribution management server public key may be transmitted from the authentication server 18 to the contents server 19. The distribution management server public key may act as a certificate to identify that the contents server 19 is permitted to distribute a program. The contents server 19 may receive and store the distribution management server public key in preparation for program distribution.

[1.4.2] Program Distribution Request

Figure 7:
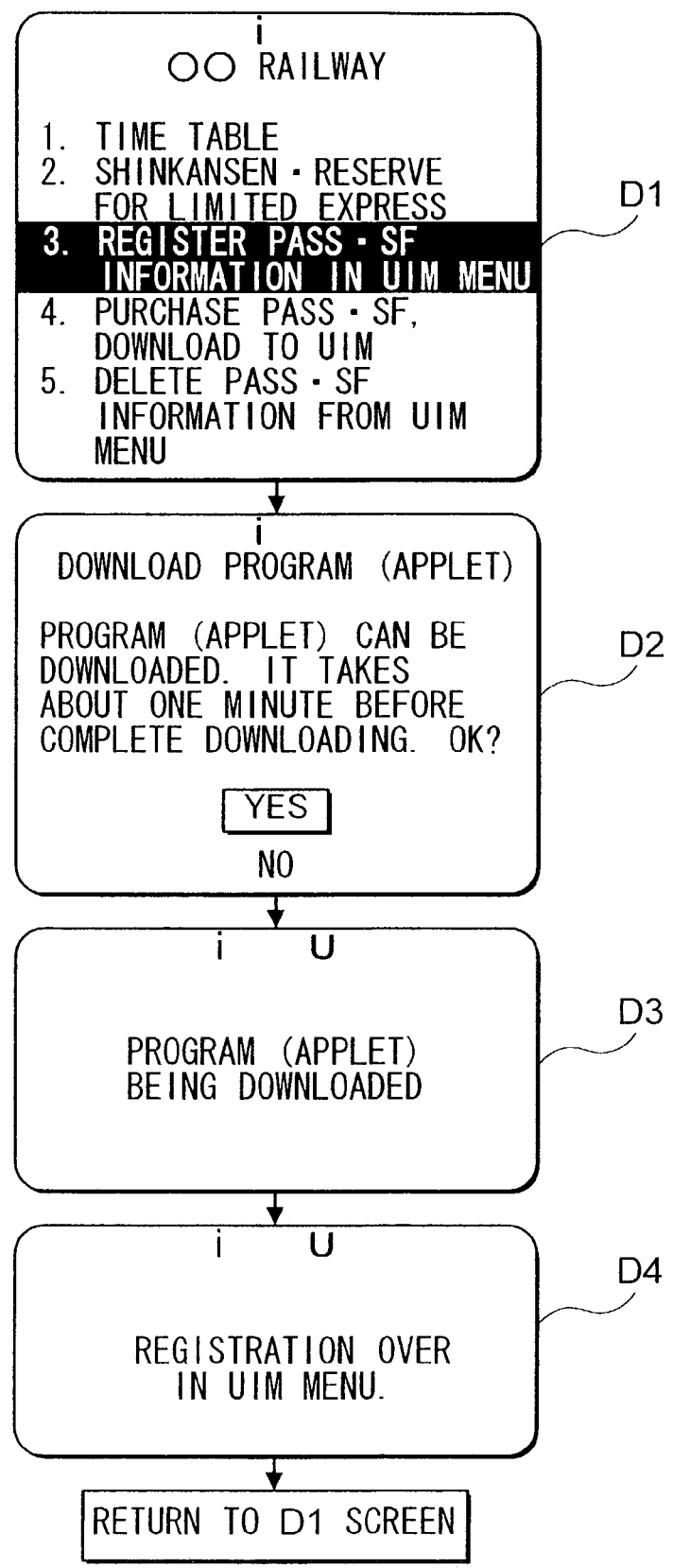
FIG. 7 is a diagram showing a display screen of the mobile terminal of FIG. 2 at the time of program distribution.

A user of the mobile terminal 11 can cause the control unit 31 to execute a browser on the mobile terminal 11. The browser may be operated by the user with the operating section 22 (FIG. 2) of the mobile terminal 11 to access a home page of a contents provider 19, such as a commuter railway service. As a result of this access, a distribution menu screen, such as example screen D1 in FIG. 7 may be displayed on the display section 21 (FIG. 2) of the mobile terminal 11. The distribution menu screen D1 may display the programs available for distribution by the contents server 19. The user may select from the display to transmit a program distribution request from the mobile terminal 11 through the network to the contents server 19 by operating the operating section 22 (FIG. 2) of the mobile terminal 11 (step S12).

[1.4.3] UIM Certificate Issue Request

The contents server 19, upon receipt of a distribution request from the mobile terminal 11, may send a certificate issue request to the authentication server 18 (step S13). The certificate issue request may include information specifying the UIM 12 of the mobile terminal 11. A certificate may be requested to enable the contents server 19 to conduct encrypted communication of the public key type with the UIM 12. More specifically, for encrypted communication of the public key type, a UIM private key and a UIM public key pair may be generated in advance by the UIM 12. Following generation, the UIM private key may be stored in the UIM 12. The UIM public key may be stored in the authentication server 18. In step S13, the UIM public key stored in the authentication server 18 may be requested as a certificate of permission to distribute a program addressed to the UIM 12.

[1.4.4] Issue of Certificate and Distribution of Program with a Certificate to a UIM Upon receipt of a certificate issue request from the contents server 19, the authentication server 18 may issue to the contents server 19 a UIM public key (step S14). The UIM public key may be a certificate corresponding to the UIM 12 specified by the particular certificate issue request of the contents server 19. The contents server 19 may encrypt the program requested for distribution using the UIM public key corresponding to the UIM 12. A program obtained with such encryption may be considered a program that is legitimately provided by a contents provider who has been authorized to access the UIM 12.

The program encrypted by the UIM public key may be further encrypted by the contents server 19 using the distribution management server public key previously received from the authentication server 18. The twice encrypted program can be considered to have two certificates attached. The first certificate may indicate a content server 19 of a contents provider authorized to access the UIM 12. The second certificate may indicate legitimacy of the content server 19 (and the content provider) and authorization to distribute a program through the distribution management server 16.

[1.4.5] Program Distribution

The contents server 19 may distribute the program encrypted by the aforementioned two encryption sessions to the distribution management server 16 through the network (step S15). The distribution management server 16 may decrypt the encrypted program distributed from the contents server 19, using the distribution management server private key. Once this decryption is successful, the program is encrypted only by the UIM public key. In this case, the contents server 19 can be considered a legitimate entity authorized to distribute a program addressed to the UIM 12. Following decryption, the distribution management server 16 may transmit the data on a download screen such as screen D2 shown in FIG. 7 to the mobile terminal 11, and cause the data to be displayed on the display section 21 (FIG. 2). The download screen may request confirmation from the user to proceed with distribution of the requested program.

[1.4.6] Writing in UIM

After the user confirms on the download screen using the operating section 22 (FIG. 2) that the program distribution should proceed, a notice to permit distribution may be sent to the distribution management server 16. The distribution management server 16, upon receipt of the notice, may distribute to the UIM 12 the program obtained by decryption, i.e. the program encrypted by the UIM public key (step S16).

The encrypted program may be delivered to the control unit 30 of the UIM 12 through the mobile terminal 11. Specifically, the mobile terminal 11 may simply provide the UIM 12 with the encrypted program. This operation by the mobile terminal 11 may provide secure transmission to the UIM 12 within the mobile terminal 11, and a secure write operation into the UIM 12.

The distribution management server 16 may send a program to the UIM 12 as previously discussed. Thus, the distribution management server 16 may first establish a link with the UIM 12. To establish the link, the distribution management server 16 may acquire an identifier of the mobile terminal 11 with the UIM 12 connected thereto and/or built therein. The identifier may be a telephone number of the mobile terminal 11, or any other identification of the mobile terminal 11.

One technique to acquire an identifier may occur when a distribution request is issued from the mobile terminal 11 to the contents server 19. The telephone number of the mobile terminal 11 may be transmitted to the contents server 19 in addition to the distribution request. The contents server 19 may send the telephone number received from the mobile terminal 11 to the distribution management server 16 encrypted by only the distribution management server public key. In this way, the distribution management server 16 can access the mobile terminal 11 using the telephone number received from the contents server 19. Thus the distribution management server 16 can distribute a program addressed to the UIM 12.

Alternatively, an identifier may be determined between the mobile terminal 11 and the distribution management server 16 in place of the telephone number of the mobile terminal 11. The identifier may be determined in advance of issuing a distribution request from the mobile terminal 11 to the contents server 19. The distribution management server 16 may store the telephone number of the mobile terminal 11 and the corresponding identifier in a database.

The mobile terminal 11 may send a distribution request containing the identifier to the contents server 19. The contents server 19 may attach the identifier to a program sent to the distribution management server 16. The distribution management server 16 may determine the telephone number of the mobile terminal 11 from the identifier included with the program. Based on the determined telephone number, the distribution manager 16 may contact the mobile terminal 11 and distribute the program addressed to the UIM 12. This technique may be advantageous over the previously described technique since the telephone number of the mobile terminal 11 does not need to be provided to the contents server 19.

The control unit 30 (FIG. 4) of the UIM 12 may receive a requested program encrypted by a UIM public key as previously described. The requested program may be decrypted by the control unit 30 using a UIM private key paired with the particular UIM public key. Once the decryption is completed successfully, the non-encrypted requested program may be in the form of ordinary text. The contents server 19 that is the source of the requested program is considered an entity duly authorized to distribute a program to the UIM 12. The UIM 12 may write the un-encrypted requested program in the appropriate one of the basic blocks 40 of the memory 12 (FIG. 4). During the write operation, a download in progress screen such as the example screen D3 shown in FIG. 7 may be displayed by the mobile terminal 11.

[1.4.7] Write Completion Response

At the end of the program write operation, the control unit 30 (FIG. 4) of the UIM 12 may transmit a write completion notice to the distribution management server 16 (step S17). Location information specifying the basic block 40 (FIG. 4) where the requested program is written may be provided with the write completion notice. A write completion screen such as the example screen D4 shown in FIG. 7 may also be is displayed on the display section 21 (FIG. 2) of the mobile terminal 11. The write completion screen may indicate that the write operation is complete (the registration is over). After that, the distribution menu screen, such as screen D1 (FIG. 7) may be displayed.

[1.4.8] Distribution Completion Notice

The distribution management server 16 may register the location information upon receipt of a program write completion notice from the UIM 12. The location information may be stored in a database included with the distribution management server 16. The stored location information may include information indicating the basic block 40 (FIG. 4) of the UIM 12 in which the particular program is written. By accessing the database, the distribution management server 16 can identify the program stored in each of the basic blocks 40 (FIG. 4) of the UIM 12.

The distribution management server 16 may start a billing process upon distribution of a program to the UIM 12. The billing process may charge the contents provider that operates the contents server 19 from which the program is distributed. The timing of the start of the billing process may coincide with distribution of a program. Alternatively, the billing process may commence at any other time, such as coincident with the timing of activation of a distributed program.

The contents provider may be billed for one or more of the following items:

(a) Rental charge for storage of a program in the basic blocks 40 of UIM 12. Upon distribution of a program from the contents server 19 to the UIM 12, the particular program may be stored in one of the basic blocks 40-1 to 40-6 in the UIM 12. The particular basic block 40 can be considered as storage space that is rented to the contents provider operating the contents server 19 to store the distributed program. Thus, a rental charge corresponding to the rental period, i.e. the period during which the program is stored in the basic block 40, may be levied against the contents provider.

(b) Transaction Fee

The program transmitted from the contents server 19 may be distributed to the UIM 12 through the distribution management server 16. Compensation for the processes performed by the distribution management server 16 may be charged to the contents provider as a transaction fee. The user of the UIM 12 may also be billed for services associated with the distribution of a program from the contents server 19. Following receipt of such services, the user may be required to pay a service charge. The distribution management server 16 may collect the service charge from the user on behalf of the contents provider. In addition, the distribution management server 16 may collect a communication charge from the user. The distribution management server 16 may deliver the collected service charges to the contents provider 19. The service charges may be provided as a "factor". The rental charge and/or transaction fees levied against the contents provider may be deducted from the service charge fee to result in a factoring fee. The factoring fee may be provided to the content provider as a form of commission. Upon completed program distribution, the distribution management server 16 may notify the contents server 19 (step S18).

[1.4.9] Activation

The program distributed to the UIM 12 and stored in the basic block 40 (FIG. 4) may not be executable by the user prior to activation. The user may receive the distribution but may not be permitted to execute the distributed program. Instead, the contents provider may control the program execution start time with an activation control. Activation control by the contents provider may be effectively utilized, for example, when the content provider desires to control the time when a newly marketed game program is to start. By use of the activation control, the release date (program distribution date) and the date to start use of the program (activation date) can be set separately from each other. Thus, the content provider may control the load on the contents server 19.

In another example, a program for using the mobile terminal 11 as a commutation pass is distributed to the UIM 12. In this example, the activation control may be utilized by the contents provider to make the program executable from the first date of the term of validity of the commutation pass.

[1.4.9.1] Activation Request to Distribution Management Server

Figure 8:
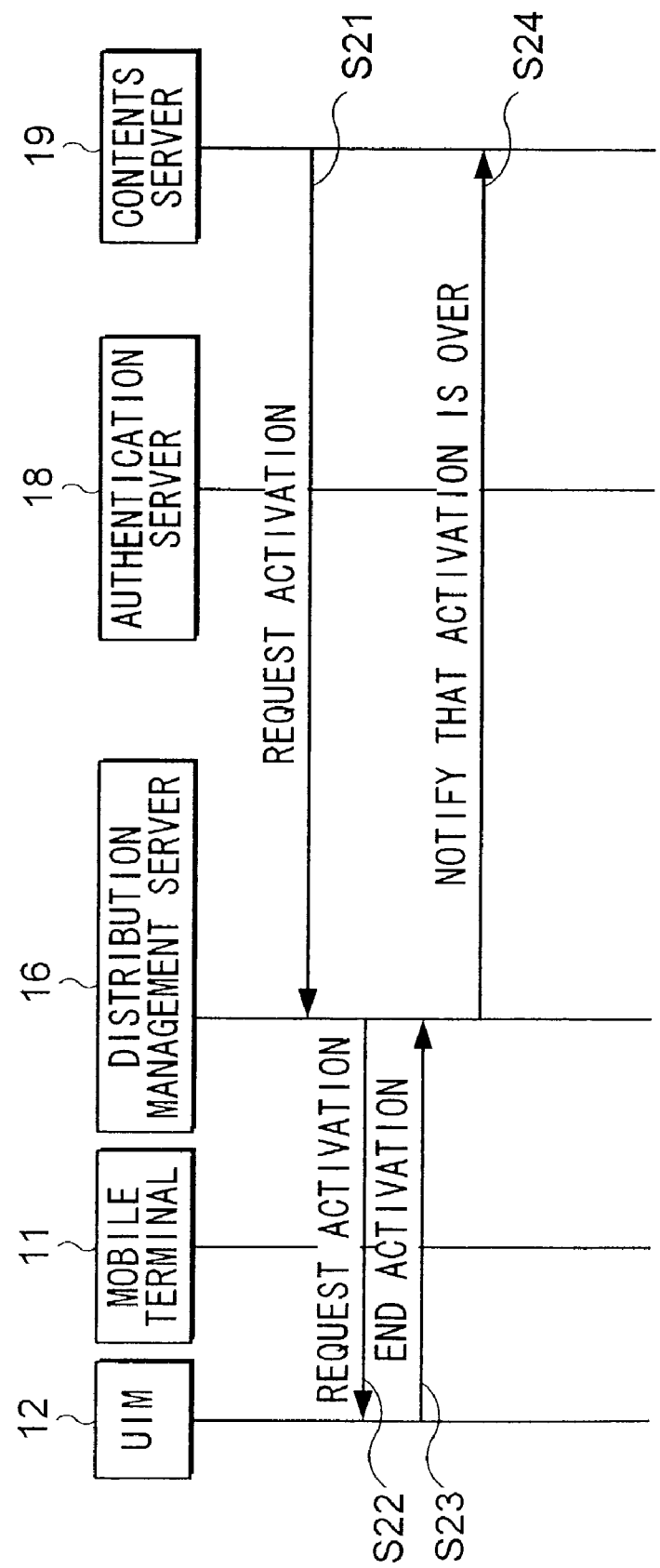
FIG. 8 is a sequence diagram showing the program activation operation in the program distribution system of FIG. 1.

FIG. 8 is an example activation control operation for a distributed program. Whenever activation is desired for a given program, the contents server 19 may send an activation request to the distribution management server 16 (step S21). This activation request may contain information specifying a program to be activated. Also, when a program stored in the UIM 12 of a specific user is activated, the activation request may contain the identifier. The identifier, such as the telephone number of the mobile terminal 11, or an alternative identifier, may identify the mobile terminal 11 being used by a user.

[1.4.9.2] Activation Request to UIM

Upon receipt of an activation request, the distribution management server 16 may issue an activation request to the UIM 12 of the mobile terminal 11 (step S22). As already described, information specifying the location of the distributed program may be registered in the database of the distribution management server 16. The information may indicate the basic block 40 (FIG. 4) of the UIM 12 in which the distributed program is written. The distribution management server 16 may refer to the database upon receipt of an activation request. The database may be used to determine the UIM 12 where the program to be activated was distributed, and the basic block 40 (FIG. 4) within the UIM 12 in which the program is written.

When activation of the same program stored in a plurality of UIMs 12 is desired, separate activation processes may be performed in each of the UIMs 12. Each mobile terminal 11 in which the corresponding UIM 12 is mounted or built may be accessed. An activation request may be sent to each of the UIMs 12. The activation request sent to each mobile terminal 11 may contain the location information specifying the basic block 40 (FIG. 4) where the program to be activated is stored.

The activation request may be directly sent to the UIM 12 when received by the mobile terminal 11. The control unit 30 (FIG. 3) of the UIM 12 may execute the activation in accordance with the activation request. Specifically, the UIM 12 may set the previously discussed activation flag from "0" to "1" for the basic block 40 (FIG. 4) specified by the activation request. In response, the control unit 30 of the UIM 12 may execute the program stored in the basic block 40 with the activation flag set to "1". A request to execute a program in a basic block 40 with an activation flag set to "0", however, may be rejected by the control unit 30.

[1.4.9.3] Activation End Response

Upon completion of program activation, the UIM 12 may transmit an activation completion notice to the distribution management server 16 (step S23). The activation completion notice may include information specifying the program that was just activated. More specifically, the activation completion notice may include information specifying the basic block 40 where the activated program is stored.

[1.4.9.4] Activation Completion Notice

From the activation completion notice received from the UIM 12 the distribution management server 16 may determine the basic block 40 (FIG. 4) of the UIM 12 in which the activated program is stored. Information indicating that the activation is complete may be registered in a storage area of the database prepared for the particular basic block 40 (FIG. 4). As the result of the registration, the distribution management server 16 can access the database to determine whether each program in the basic blocks 40 is activated for all of the UIMs 12.

Registration of the activation completion notice for each of the UIMs with programs that were requested to be activated may be completed by the distribution management server 16. The distribution management server 16 may then notify the contents server 19 that the program activation is complete (step S24). Notification by the distribution management server 16 may include information specifying the program that has been activated.

[1.4.10] Deactivation

A program distributed to the UIM 12 and then activated may require deactivation. This requirement may occur, for example, when a program that enables the mobile terminal 11 to function as a credit card is stored in the UIM 12, and a user has lost the particular UIM 12. In such a case, the deactivation is started in response to a request from the user informed of the loss. Other examples include a case where a user that has received a service has failed to pay the service charge before the due date. In such a case, at the request of the contents provider providing the service, deactivation of the program for receiving the particular service can be initiated.

[1.4.10.1] Deactivation Request to Distribution Management Server

Figure 9:
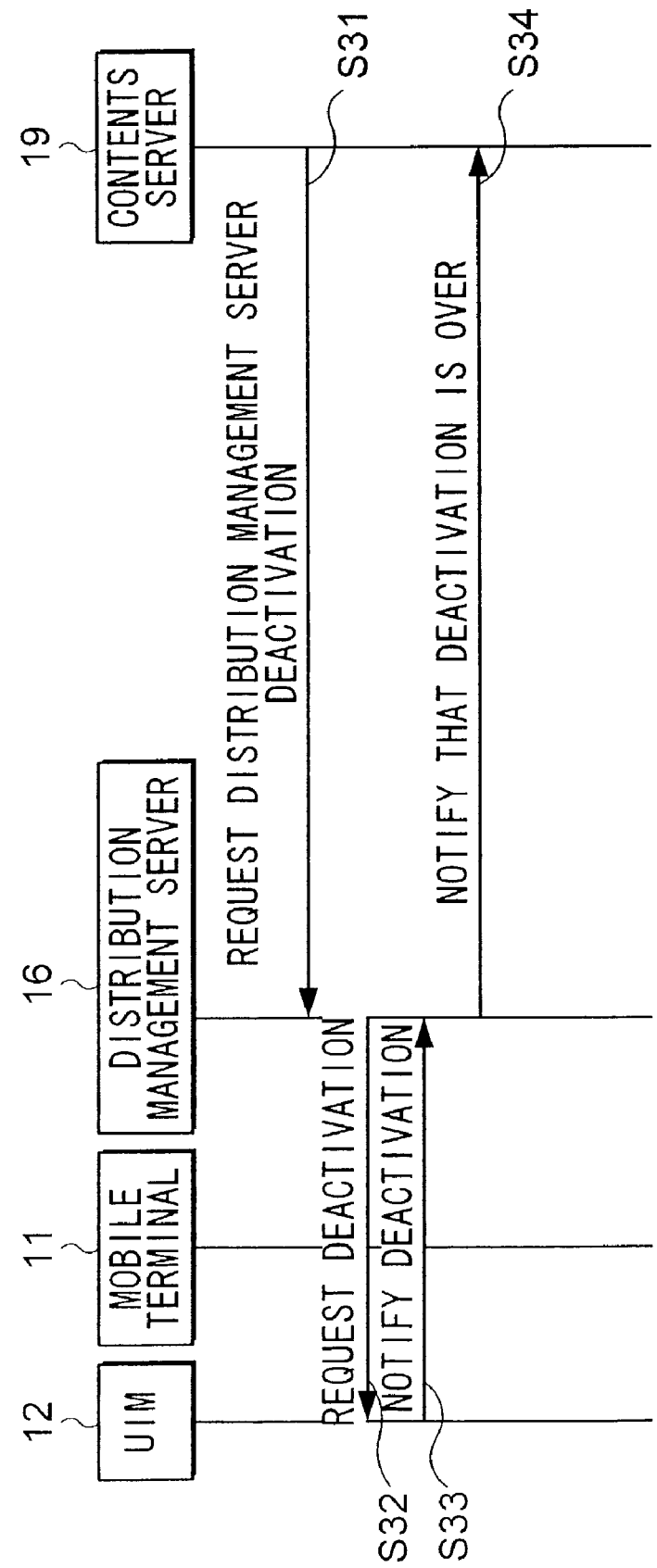
FIG. 9 is a sequence diagram showing the processes of program deactivation in response to a request from the contents server in the program distribution system of FIG. 1.

FIG. 9 is an example deactivation process. The contents server 19 may send a deactivation request to the distribution management server 16. The deactivation request may specify the particular UIM 12 and the program to be deactivated (step S31).

[1.4.10.2] Deactivation Request to UIM

The distribution management server 16 may access the database upon receipt of a deactivation request. The database may be accessed to determine a basic block 40 in the UIM 12 that stores the program specified by the deactivation request. The distribution management server 16 may send a deactivation request to the mobile terminal 11 in which the particular UIM 12 is mounted or built (step S32). The deactivation request may contain information specifying the basic block 40 (FIG. 4) storing the program to be deactivated.

The deactivation request may be sent to the UIM 12 through the mobile terminal 11. The activation flag prepared for the basic block 40 specified by the deactivation request may be reset from "1" to "0" by the UIM 12. After that, the execution of the program in this particular basic block 40 may be prohibited.

[1.4.10.3] Deactivation End Response

The UIM 12 may notify the distribution management server 16 upon termination of the program deactivation (step S33). The notification may include information specifying the program that has been deactivated. In addition, the notification may include information specifying the basic block 40 storing the program.

[1.4.10.4] Deactivation Completion Notice

The distribution management server 16 may determine that deactivation of a distributed and previously activated program is complete. The determination may occur upon receipt of a program deactivation end notice from the UIM 12. Based on the notice, the distribution management server 16 may determine the basic block 40 of the UIM 12 storing the deactivated program. The determination that the deactivation is complete may be registered in the storage area of the database that was prepared for the particular basic block 40. Upon registration of completion of the deactivation, the distribution management server 16 may notify the contents server 19 of the completion of the deactivation (step S34).

[1.4.11] Deletion (Only when Desired by User)

A deactivated program may wastefully occupy a memory area in the UIM 12. It may be desirable to both the user and/or the contents provider to delete such a deactivated program. The functional capability to directly delete the deactivated program, however, may not be enabled for the user. If the user is capable of arbitrarily deleting a deactivated program in the UIM 12, the rental charges for the UIM 12 may continue to be charged to the contents provider. The rental charges may continue in spite of the program deletion until notification of the deletion of the program is provided to the distribution management server 16.

Accordingly, when the user desires to delete a program, the program may be deleted with some form of oversight and/or control by the distribution management server 16. The decision to delete a program from the UIM 12 may be approved by the user of the mobile terminal 11. Due to the resulting complication of the charging process, approval of the deletion of a program by the contents provider may not be permitted.

[1.4.11.1] Program Deletion Request

Figure 10:
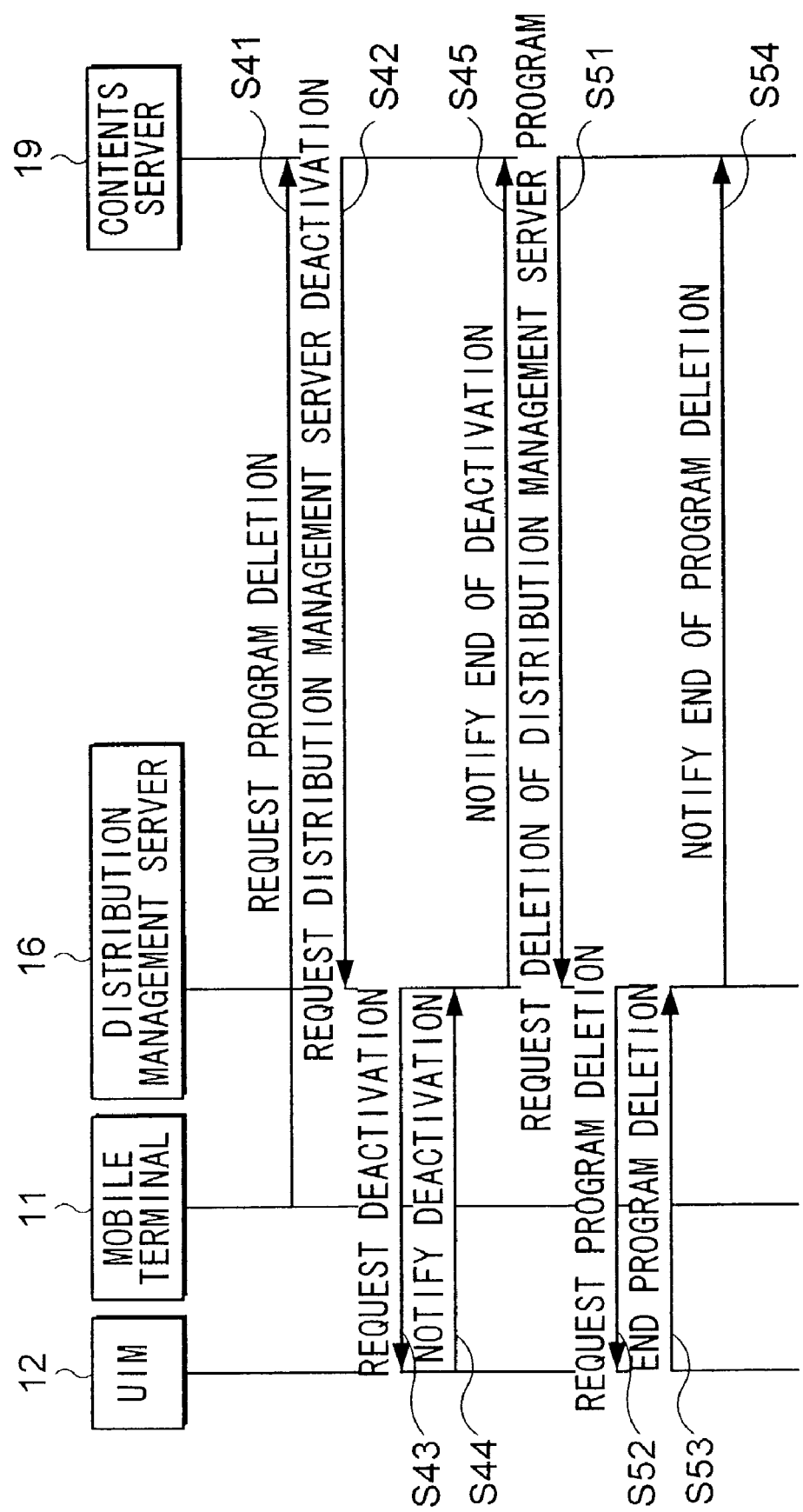
FIG. 10 is a sequence diagram showing the process of a program delete operation in response to a request from the contents server in the program distribution system of FIG. 1.
Figure 15:
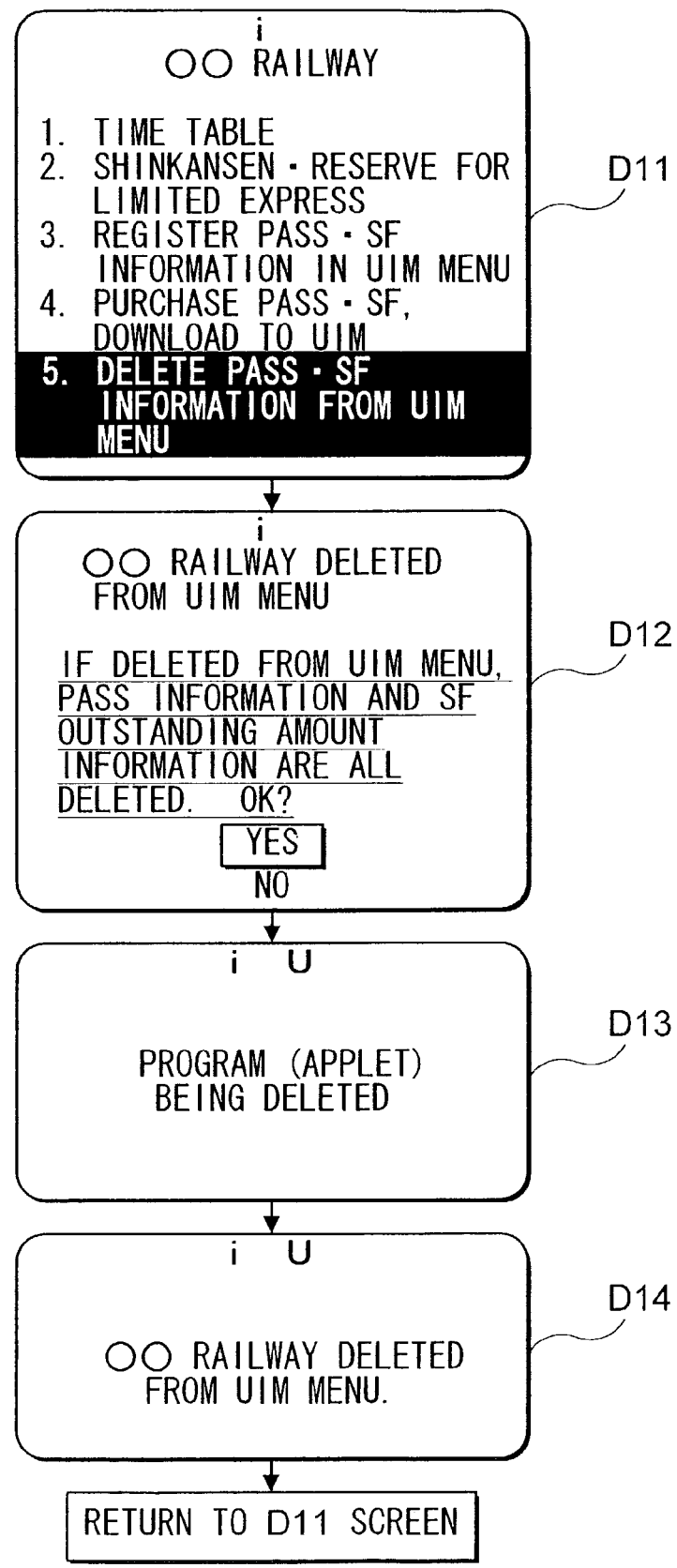
FIG. 15 is a process diagram illustrated as a display screen of the mobile terminal of FIG. 2 provided to the user at the time of program deletion.

An example operation to delete a program in response to the desires of a user will be hereinafter explained with reference to FIGS. 10 and 15. The user may access a predetermined home page of a contents provider by operating the operating section 22 (FIG. 2) of the mobile terminal 11. A distribution menu screen such as screen D11 shown in FIG. 15 may be displayed on the display screen of the display section 21 (FIG. 2) of the mobile terminal 11. The distribution menu screen may be provided by the contents server 19 of the contents provider distributing the program. When the user selects a menu item to delete a program, a deletion confirmation screen such as screen D12 (FIG. 15) may be displayed on the display section 21 (FIG. 2) of the mobile terminal 11.

A user may confirm the operation to perform the deletion. Following confirmation, the mobile terminal 11 may transmit a program deletion request to the contents server 19 through the public network 20 (FIG. 1) (step S41). This request may include information specifying the program to be deleted. Upon transmission of a program deletion request, a deletion in progress screen, such as screen D13 (FIG. 15) may be displayed on the display section 21 (FIG. 2) of the mobile terminal 11. The deletion in progress screen may indicate that the deletion is occurring.

[1.4.11.2] Deactivation Request to Distribution Management Server

Upon receipt of a program deletion request, the contents server 19 may send a deactivation request to the distribution management server 16 (step S42). The deactivation request may contain information identifying the mobile terminal 11 of the user requesting the program deletion, and information specifying the program to be deleted.

[1.4.11.3] Deactivation Request to UIM

In response to receipt of a deactivation request, the distribution management server 16 may access the database and determine a basic block 40 (FIG. 4) where the program to be deleted is stored. The distribution management server 16 may then send a deactivation request to the mobile terminal 11 being operated by the user requesting the program deletion (step S43). The deactivation request may include information specifying the determined basic block 40.

This deactivation request may be sent to the UIM 12 through the mobile terminal 11. The UIM 12 may reset from "1" to "0" the activation flag associated with the determined basic block 40 specified by the deactivation request. Once the activation flag is set to "0" execution of the program in the particular basic block 40 may be prohibited.

[1.4.11.4] Deactivation End Response

The UIM 12 may transmit a deactivation end notice to the distribution management server 16 when deactivation of the program is complete (step S44). The deactivation notice may include information specifying the basic block 40 storing the deactivated program.

[1.4.11.5] Deactivation End Notice

The distribution management server 16, upon receipt of the program deactivation end notice from the UIM 12, may register information in the database indicating that deactivation is complete. The information may be stored in an area of the database corresponding to the basic block 40 of the UIM 12 specified by the deactivation end notice. The distribution management server 16 may send a program deactivation end notice to the contents server 19 (step S45).

[1.4.11.6] Deletion Request to Distribution Management Server

The contents server 19 may receive the deactivation end notice for the program to be deleted from the distribution management server 16. In response, the contents server 19 may request the distribution management server 16 to delete the particular program (step S51).

[1.4.11.7] Deletion Request to UIM

The distribution management server 16 may send a program deletion request to the UIM 12 of the user who requested the program deletion (step S52). Transmission of the program deletion request to the UIM 12 may be in response to receipt of the program deletion request from the contents server 19. The program deletion request may include the information specifying the basic block 40 (FIG. 4) that stores the program to be deleted. The program deletion request may be sent to the UIM 12 through the mobile terminal 11. The UIM 12 may delete the program in the basic block 40 specified by the program deletion request.

[1.4.11.8] Deletion End Response

The UIM 12 may transmit a deletion end notice to the distribution management server 16 (step S53). The deletion end notice may indicate the deletion is complete and may include information specifying the basic block 40 that the program was deleted from, and the identity of the deleted program. At the same time, a deletion complete screen, such as screen D14 (FIG. 15), that indicates the deletion is complete may be displayed on the display section 21 (FIG. 2) of the mobile terminal 11.

[1.4.11.9] Deletion Completion Notice

The distribution management server 16 may register information indicating that the program has been deleted in a storage area in the database. The information may be registered in response to the receipt of the deletion end notice from the UIM 12. The information may be stored in a storage area of the database that corresponds to the combination of the user requesting the deletion and the deleted program.

The distribution management server 16 may send to the contents server 19 a notice that the program deletion is complete (step S54). If the billing process to charge the contents provider for the deleted program is already in place, the distribution management server 16 may thereafter cease to charge the contents provider.

[1.4.12] Deletion (Only when Desired by Distribution Management Server)

A program may also be deleted by other than the direction of a user of the mobile terminal 11. An example is the expiry of a predetermined term during which a program can be used by a user.

[1.4.12.1] Deactivation Request to UIM

Figure 11:
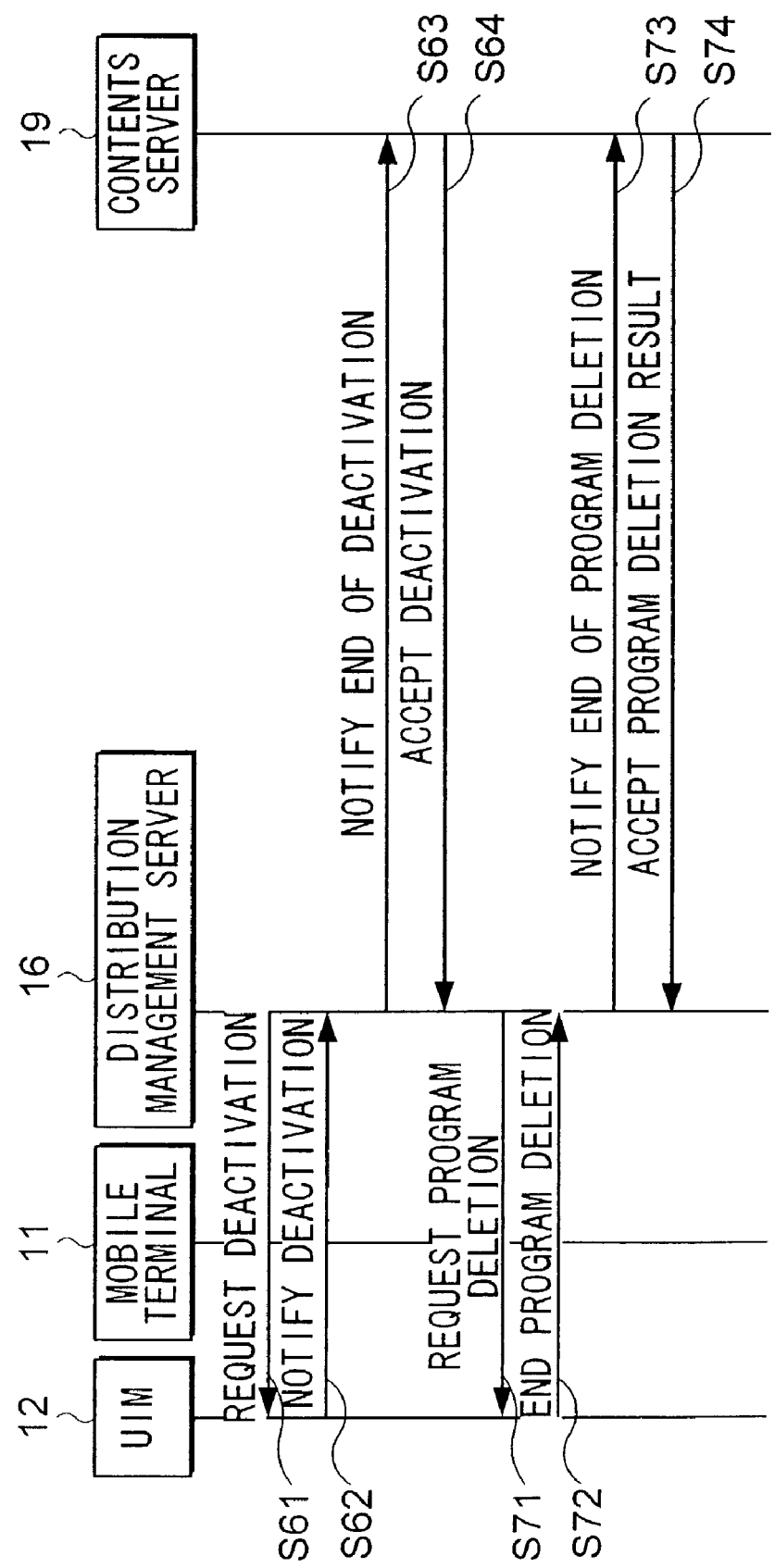
FIG. 11 is a sequence diagram showing the process of a program deactivate operation and a program delete operation in response to a request from the distribution management server in the program distribution system of FIG. 1.

FIG. 11 is an example operation for deleting a program under the guidance of the distribution management server 16. The distribution management server 16 may direct deletion of a program from the UIM 12. For example, the distribution management server 16 may delete a program when the usable term of a program has expired and the program is required to be deleted.

The distribution management server 16 may access the database to determine all the UIMs 12 where the program to be deleted has been distributed. In addition, the distribution management server 16 may determine the basic blocks 40 storing the program to be deleted in each of the UIMs 12. A deactivation request may be sent by the distribution management server 16 to each of the UIMs 12 (step S61). Each deactivation request may include information specifying the basic block 40 that stores the program to be deleted.

The deactivation request may be sent to each UIM 12 through the mobile terminal 11. The UIM 12 may reset from "1" to "0" the activation flag corresponding to the basic block 40 specified by the deactivation request. Execution of the program in the particular basic block 40 may thereafter be prohibited.

[1.4.12.2] Deactivation End Response

At the end of the deactivation, each of the UIMs 12 may transmit a deactivation end notice to the distribution management server 16 (step S62).

[1.4.12.3] Deactivation Completion Notice

The distribution management server 16 may receive a deactivation end notice from each of the UIMs 12 where the program to be deleted was distributed. In response to each deactivation end notice, the distribution management server 16 may register information indicating completion of the deactivation. The information from each deactivation notice may be registered in the storage area of the database designated for the deleted program. The distribution management server 16 may also send a program deactivation completion notice to the contents server 19 (step S63).

[1.4.12.4] Notification of Deactivation Completion Notice to Distribution Management Server The contents server 16, upon receipt of the deactivation completion notice from the distribution management server 16, may send a deactivation receipt notice to the distribution management server 16 (step S64).

[1.4.12.5] Deletion Request to UIM

The distribution management server 16 may receive the deactivation receipt notice. In response, the distribution management server 16 may send a program deletion request to the mobile terminal 11 that transmitted the deactivation completion notice corresponding to the deactivation receipt notice (step S71). The deletion request sent to the mobile terminal 11 may include information specifying the basic block 40 storing the program to be deleted. Upon receipt of the deletion request through the mobile terminal 11, the UIM 12 may delete the program in the basic block 40 specified by the request.

[1.4.12.6] Deletion End Response

The UIM 12 may transmit a deletion end notice to the distribution management server 16, at the end of the program deletion (step S72). The notice may include information specifying the basic block 40 from which the program was deleted.

[1.4.12.7] Deletion Completion Notice

The distribution management server 16 may receive the deletion end notice from all the UIMs 12 to which the program to be deleted had been distributed. In response, the distribution management server 16 may register information indicating that the program has been deleted in a storage area of the data base designated for the particular deleted program. In addition, the distribution management server 16 may send a deletion completion notice to the contents server 19 (step S73). The distribution management server 16 may also stop further billing to the contents provider for the deleted program.

[1.4.12.8] Deletion Result Receipt Notice to Distribution Management Server

The contents server 19, upon receipt of the deletion completion notice from the distribution management server 16, may send a deletion result receipt notice to the distribution management server 16 (step S74). The deletion result receipt notice confirms that the contents server 19 is aware that the deletion of the program is complete.

[1.4.13] Program Distribution Process for UIM Version Management

The contents server 19 may also distribute a program voluntarily without initiation of distribution by the user. Distribution of an upgrade of a program that has previously been distributed is an example where this may occur. Distribution of a newer version of a program to the UIMs 12 of all the users to which the particular program has been distributed, however, may give rise to program execution issues. The execution issues may be due to the mobile terminals 11 being various models, and the UIM specifications may have various versions. Thus, a newer version of a program, if sent to all the UIMs 12, may be executable without errors only by those UIMs 12 having a UIM version issued after a certain point in time.

To avoid such program execution issues, each time an upgrade of a distributed program is available, a version notice request may be sent to those UIMs 12 having the distributed program. Based on the UIM version provided in response to the request, it is determined whether the program upgrade is to be distributed to a given UIM 12.

Figure 12:
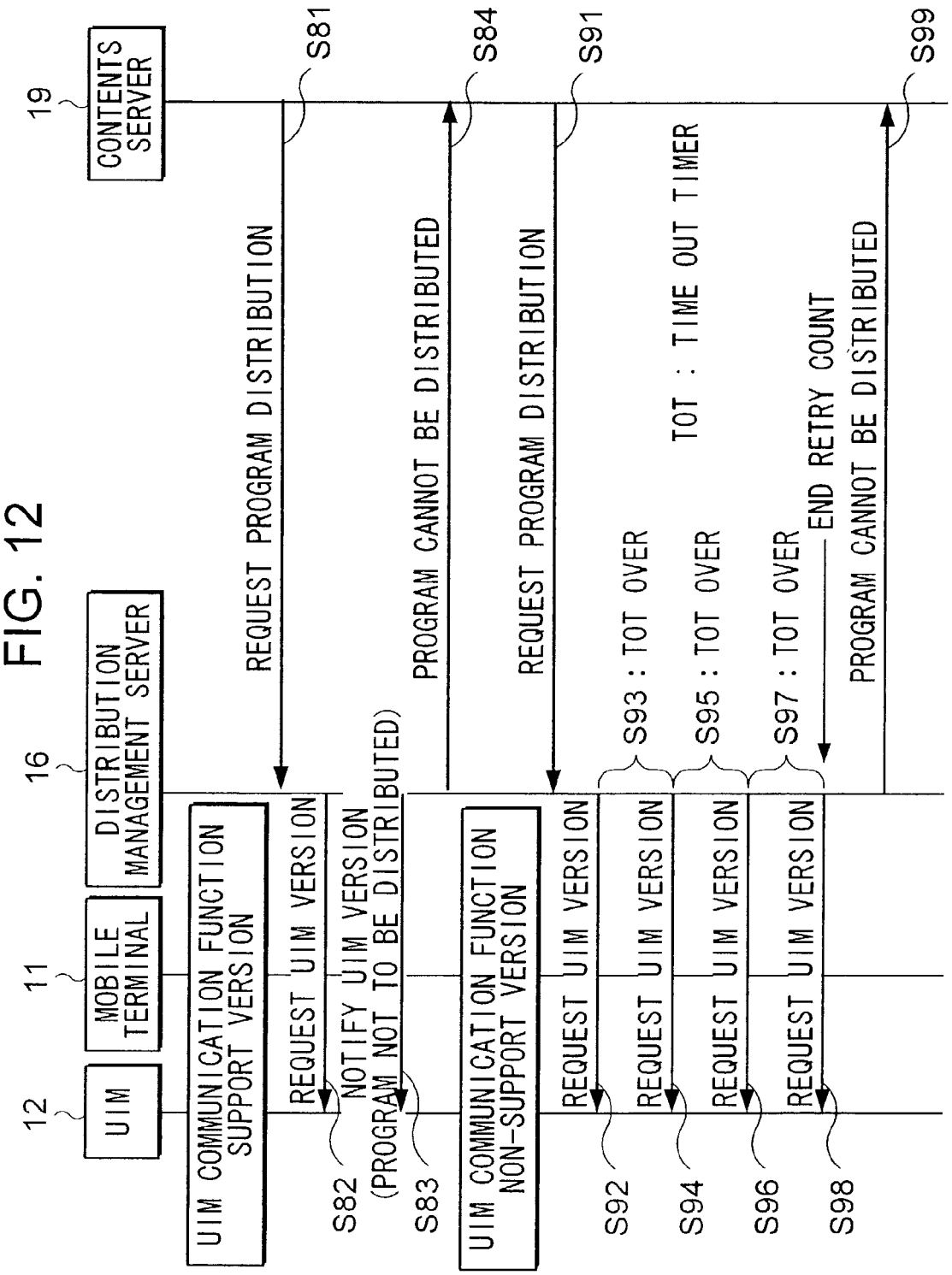
FIG. 12 is a sequence diagram of the UIM exchanging the version information in the program distribution system of FIG. 1.

FIG. 12 is an example operation to upgrade a distributed program. Some of the UIMs 12 may include functionality to provide the version of the UIM 12 in response to a version notice request, and others may not. Accordingly, the example of FIG. 12 shows the operation performed when a version notice request has been sent to a UIM 12 supporting such a function. In addition, FIG. 12 also illustrates an example operation performed when a version notice request is not supported by the functionality of a UIM 12 that includes the distributed program.

[1.4.13.1] Operational Example for a UIM Supporting Version Notice Function

[1.4.13.1.1] Program Distribution Request to Distribution Management Server

Prior to distribution of a program upgrade, the contents server 19 may send to the distribution management server 16 a program distribution request (step S81). The program distribution request may include information specifying the distributed program targeted for a version upgrade. In addition, the distribution request may include version information indicating the version of the UIM 12 that can execute the particular program.

[1.4.13.1.2] Version Notice Request to UIM

Upon receipt of a program distribution request, the distribution management server 16 may access the database. The database may be accessed to identify all the mobile terminals 11 to which the program specified by the program distribution request has been distributed. In addition, the distribution management server 16 may send a version notice request to the mobile terminals 11 that have been identified (step S82).

[1.4.13.1.3] Version Notice

The version notice request may be sent to each UIM 12 through the associated mobile terminal 11. Upon receipt of the version notice request, each of the UIMs 12 may send a version notice to the distribution management server 16 (step S83). Each version notice may provide the UIM version operating on that particular UIM 12.

[1.4.13.1.4] No Program Distribution Notice

The distribution management server 16 may receives a version notice from each UIM 12. When the version notice received from a given UIM 12 fails to meet the conditions indicated by the version information from the contents server 19, the contents server 19 may be notified (step S84). The notification to the contents server 19 may indicate that the program cannot be distributed to the particular UIM 12. If, on the other hand, the version notice received from a UIM 12 meets the conditions indicated by the version information from the contents server 19, the distribution management server 16 may distribute the program upgrade to the particular UIM 12. Distribution and activation of the program upgrade may be performed similarly to the program distribution and activation previously discussed with reference to FIGS. 6 and 8.

[1.4.13.2] Operational Example for a UIM not Supporting Version Notice Function

[1.4.13.2.1] Program Distribution Request to Distribution Management Server

The contents server 19 may send a program distribution request to the distribution management server 16 in the same manner as described above (step S91).

[1.4.13.2.2] Version Notice Request to UIM

The distribution management server 16 may send a version notice request to the UIM 12 of the mobile terminal 11 (step S92).

[1.4.13.2.3] Timer Count

In this example, the UIM 12 does not support the version notice function, and therefore makes no response. The distribution management server 16 may monitor a timer. Upon expiry of a predetermined time-out period (step S93), the distribution management server 16 may send a second version notice request to any non-responsive UIMs 12 of the mobile terminals 11 (step S94). When the second version notice request is sent, the value of a retry counter may be incremented by one by the distribution management server 16. In a similar fashion, the distribution management server 16 may again monitor the timer. Upon expiry of a second predetermined time-out period (step S95), the distribution management server 16 may send a third version notice request to the UIM 12 of the mobile terminal 11 (step S96). The value of the retry counter may again be incremented by one.

[1.4.13.2.4] No Program Distribution Notice

Once again the distribution management server 16 may monitor the timer. Upon expiry of a third predetermined time-out period (step S97), the distribution management server 16 may send a fourth version notice request to the UIM 12 of the mobile terminal 11 (step S98). The value on the retry counter may again be incremented by one.

When the figure on the retry counter reaches a predetermined value (3 in this example), the distribution management server 16 may determine that the version of the UIM 12 fails to meet the conditions for the version of the UIM 12 indicated by the contents server 19. As a result, the distribution management server 16 may send a no-program distribution notice to the contents server 19 (step S84). The contents server 19 may confirm that the version upgrade for a program cannot be distributed to the identified UIM 12.

[1.4.14] Program Distribution Process Based on UIM Memory Capacity Limitation

Limited memory capacity of the UIM 12 may make the distribution of a program impossible, even if desired by the contents server 19.

[1.4.14.1] Rejection by Distribution Management Server

Figure 13:
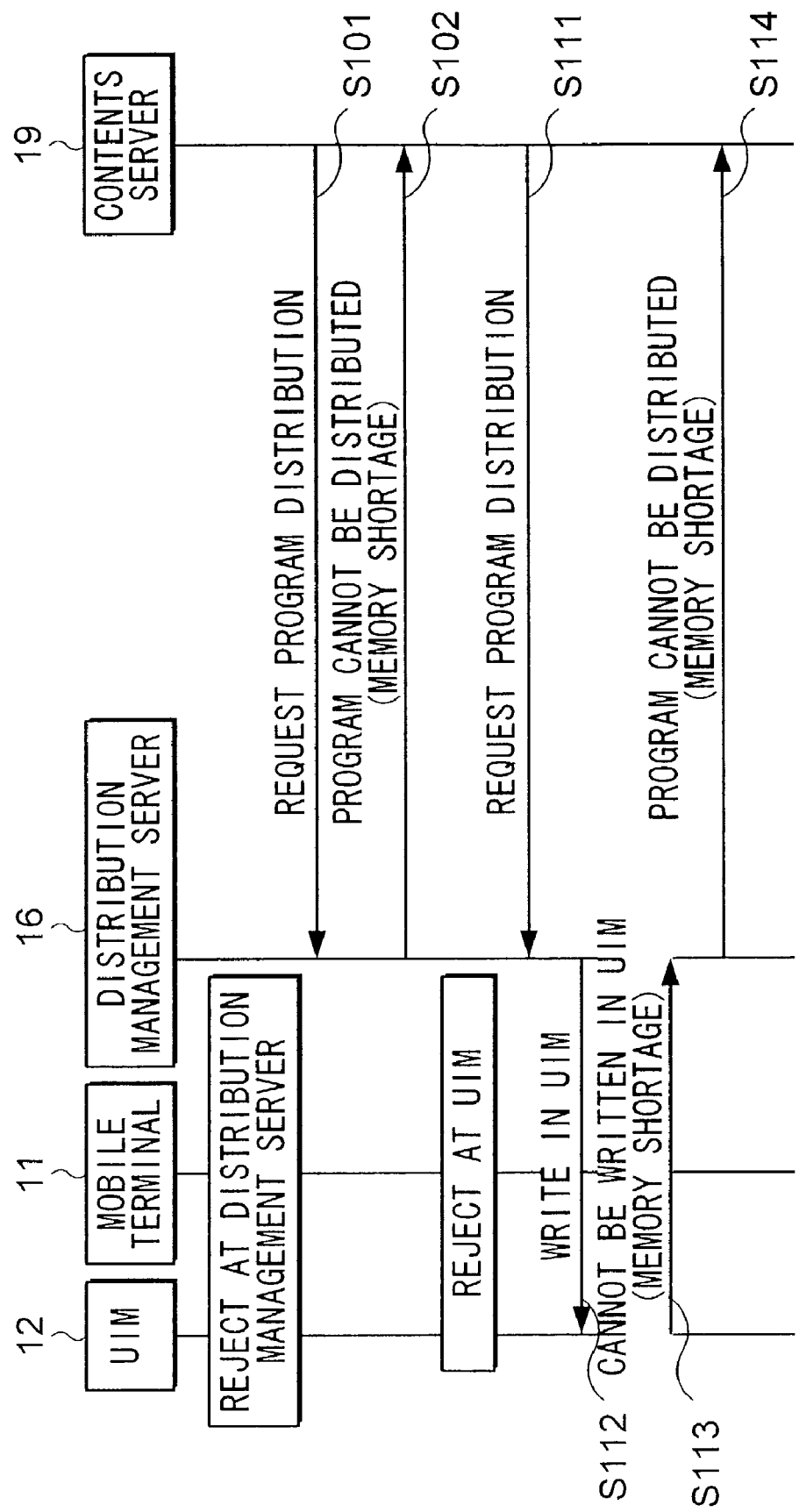
FIG. 13 is a sequence diagram showing a program distribution operation that ends in a program distribution failure due to a memory shortage.

FIG. 13 is an example operation where the memory capacity of the UIM 12 is insufficient to receive a distributed program. The contents server 19 may request the distribution management server 16 to send a program distribution request to the UIM 12 (step S101). Information indicating the memory state of each UIM 12 may be registered in the database of the distribution management server 16. The distribution management server 16 may receive the program distribution request indicating distribution to one or more given UIMs 12. The distribution management server 16 may access the database to determine whether a basic block 40 (FIG. 4) for the particular UIM 12 is available for storage. If a basic block 40 is available, the distribution management server 16 may determine if sufficient memory capacity exists to store the program (the capacity may vary from one UIM version to another). The distribution management server 16 may also determine whether there are any other issues related to distribution of the program to the specific UIM 12.

If the distribution management server 16 determines that the program cannot be distributed, the distribution management server 16 may send a notice to the contents server 19 (step S102). The notice may indicate that the program cannot be distributed, for example due to a shortage of memory capacity. In response to the notice, the contents server 19 may confirm that the program for which distribution is desired cannot be distributed to the identified UIM 12.

[1.4.14.2] Rejection by UIM

The memory capacity and the current occupancy state of each UIM 12 may be registered in the database of the distribution management server 16. For some reason, however, the actual UIM memory state may differ from the memory state registered in the database of the distribution management server 16. An example of the operation performed in such a case is illustrated in FIG. 13.

The contents server 19 may first send a program distribution request together with a program to the distribution management server 16 (step S111). The distribution management server 16 may access the database to determine whether the basic block 40 (FIG. 4) of the destination UIM 12 is available for storage and has a sufficient capacity. In the case where the determination is YES, the distribution management server 16 may send a write request together with the program to the UIM 12 (step S112). The UIM 12 that has received the write request may determine whether the program attached to the write request can be stored in any one of the basic blocks 40. If the determination is NO, the UIM 12 may send a no-program distribution notice to the distribution management server 16 due to lack of memory capacity (step S113).

Figure 14:
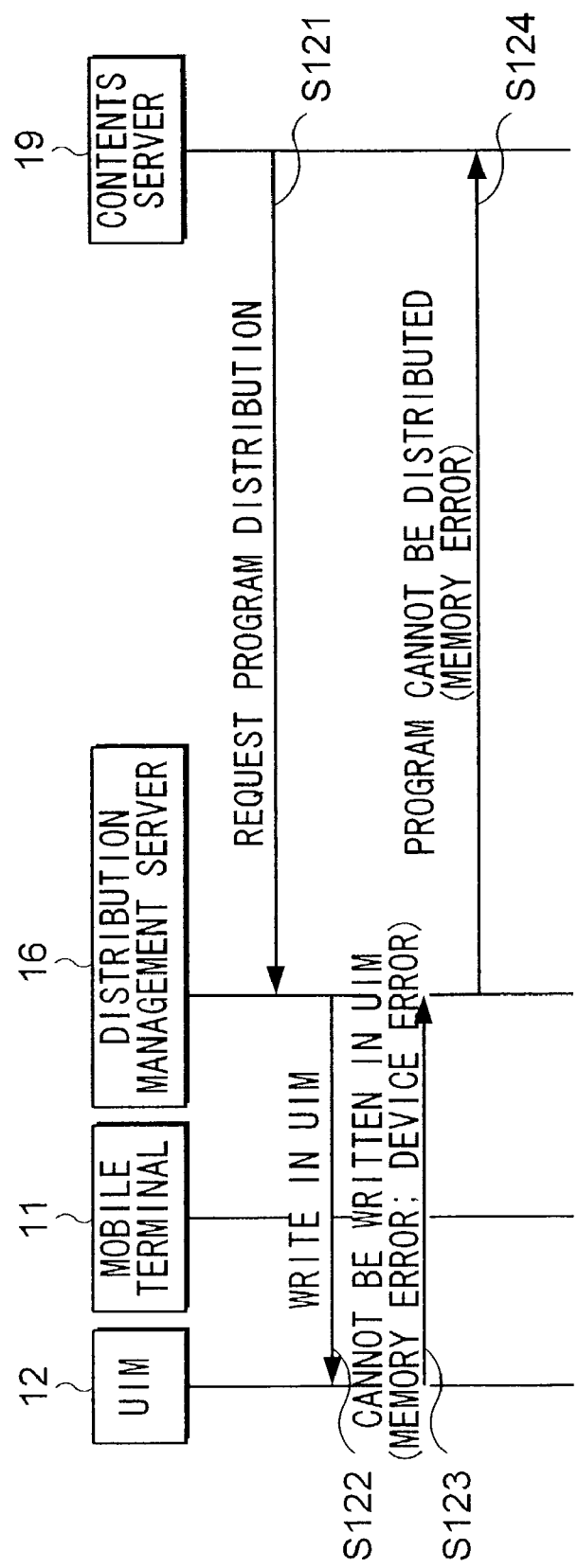
FIG. 14 is a sequence diagram showing a program distribution operation that ends in a program distribution failure due to a memory error.

The no-program distribution notice due to lack of memory capacity may be received by the distribution management server 16 and a similar message may be sent to the contents server 19 (step S114). From this notice, the contents server 19 can confirm that the program cannot be distributed to the UIM 12 to which the distribution is desired. A program may also fail to be stored in a basic block 40 due to a write error in the memory 12M (FIG. 4) of the UIM 12 or malfunction of the memory 12M. In such a case, a similar operation to the previously described operation is performed. FIG. 14 shows such an operation. In FIG. 14, steps S121 to S124 are similar to steps S111 to S114 in FIG. 13.

[1.4.15] Specific Example of Operation

Now, a specific example of operation according to the previously discussed program distribution system 10 illustrated in FIGS. 1–4 will be explained.

[1.4.15.1] Execution of Program Stored in UIM

Figure 16:
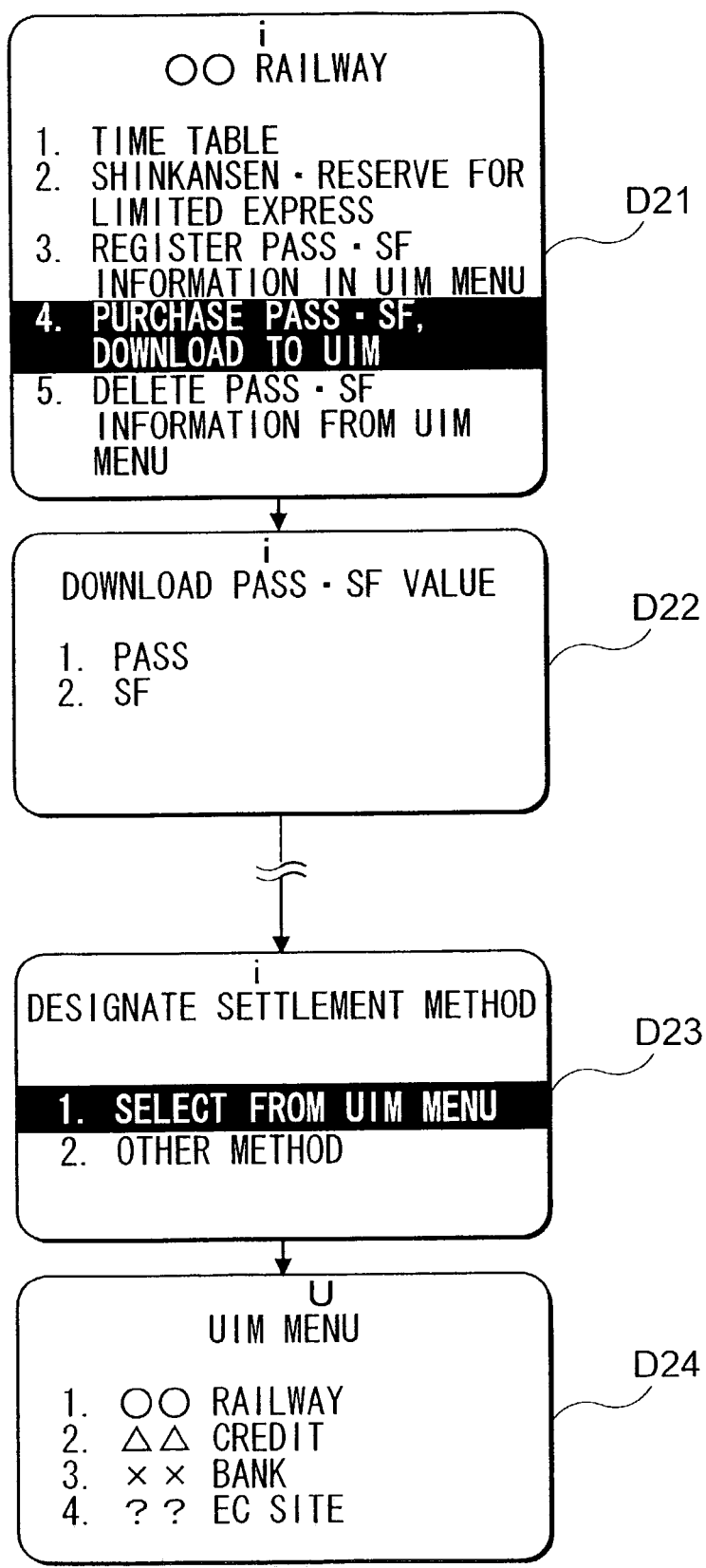
FIG. 16 is a process diagram illustrated as a display screen of the mobile terminal of FIG. 2 provided to the user at the time of account settlement for an electronic commercial transaction.

In this example of operation of the program distribution system 10 a program called "RAILWAY" is stored in the basic block 40-1 of the UIM 12. The user may operate the operating section 22 of the mobile terminal 11 to access a home page of a contents provider that has distributed the "RAILWAY" program. A distribution menu screen such as screen D21 shown in FIG. 16 may be displayed on the display screen of the display section 21. The distribution menu screen may be provided by the contents server 19 of the contents provider. The user may select an item concerning the purchase of a commutation pass from the menu displayed on the distribution menu screen. A commutation pass purchase request to purchase a commutation pass may be transmitted from the mobile terminal 11 to the contents server 19 through the public network 20.

As a result, a download screen such as screen D22 (FIG. 16) may be sent from the contents server 19 to the mobile terminal 11 and displayed on the display section 21. The download screen may include a menu of several value data selections having the same monetary value as a commutation pass. Once the user selects the desired value data, value data selection information that is a request for the selected value data may be sent to the contents server 19 from the mobile terminal 11.

After receipt of the value data selection information, the contents server 19 may send screen data for selecting a method of account settlement to the mobile terminal 11. As a result, a settlement screen, such as screen D23 (FIG. 16) may be displayed by the mobile terminal 11. The user may select "SELECT FROM UIM MENU" from the menu items in the settlement screen, and thus can settle the account by use of a program in the UIM 12. Specifically, once the selected operation is performed, the UIM 12 may be notified of completion. Upon receipt of a completion notice, the control unit 30 of the UIM 12 may return to the mobile terminal 11 a list of the programs stored in the basic blocks 40-1 to 40-6. A UIM menu screen, such as screen D24 (FIG. 16) may include a list of programs distributed to the UIM 12. The UIM menu screen may be displayed on the display section 21 of the mobile terminal 11. The user may select a settlement program from the list. The selected program may be executed by the UIM 12 to settle the account.

For purposes of this example, the account may be settled by executing a program in the program area 41 of the basic block 40-2. The data area 42 of the same basic block 40-2 may be used to settle the account. Upon detection that the account has been settled, the contents server 19 may send the value data of the commutation pass to the mobile terminal 11. The value data may then be included in the previously described commutation pass purchase request sent to the content server 19. The value data of this example may include information such as the names of the two railroad stations involved, the validity term of the commutation pass, the name of the user and the age of the user. The value data may be sent from the mobile terminal 11 to the UIM 12. The value data of this example that may be used for the "RAILWAY" program may be stored in the data area 42 of the basic block 40-1 in the UIM 12.

[1.4.15.2] Mail Order Sale Using Public Network

Figure 17:
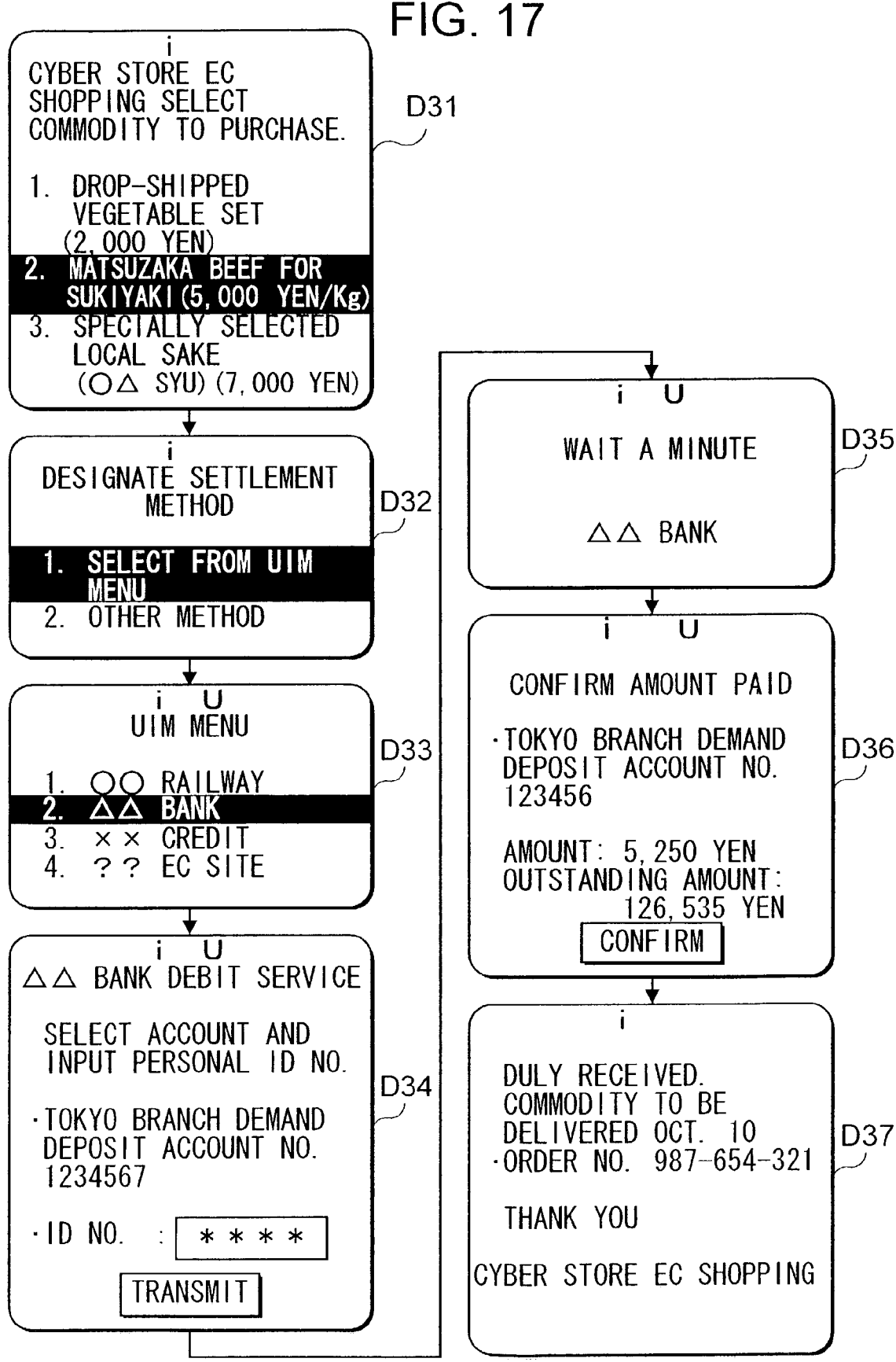
FIG. 17 is a process diagram illustrated as a display screen of the mobile terminal of FIG. 2 provided to the user at the time of a commodity purchase in a mail order sale.

In this example operation, a program for a mail order sale may be stored in the basic block 40-2 of the UIM 12. The user may access a home page of a contents provider by operating the operating section 22 of the mobile terminal 11. As a result, a distribution menu screen, such as screen D31 (FIG. 17) may be displayed on the display section 21 of the mobile terminal 11. This distribution menu screen may be provided by a contents server 19 operated by a contents provider. The contents provider may provide a mail order sale (what is called "e-commerce") service utilizing the public network 20. The user may select a desired commodity, such as MATSUZAKA BEEF FOR SUKIYAKI, Y5000/ KG, from the commodities listed in the distribution menu screen. In response to the selection, a purchase request may be transmitted from the mobile terminal 11 to the contents server 19 through the public network 20.

The contents server 19 that has received the purchase request may return a settlement screen, such as screen D32 (FIG. 17) to the mobile terminal 11. As a result, a UIM menu screen, such as screen D33 (FIG. 17) may be displayed on the display section 21. From the settlement methods listed in the UIM menu screen, the user may select a program, such as "XX BANK". A settlement program for XX Bank may be stored in the basic block 40-3 of the UIM 12. The settlement program may be started by the control unit 30 of the UIM 12, and a settlement program screen, such as screen D34 (FIG. 17) may be displayed.

The user may input settlement information such as a personal identification. (ID) number into the settlement program screen. The mobile terminal 11 may attempt to connect to the settlement server for XX Bank through the communication unit 34 and the public network 20. During this time, a processing screen, such as screen D35 (FIG. 17) may be displayed.

Upon completion of authentication of the user by XX Bank, a purchase amount confirmation screen, such as screen D36 (FIG. 17) may be displayed. The user may confirm the amount to be paid. In addition, the user may input confirmation to proceed with the transaction. The mobile terminal 11 may then display a payment confirmation screen, such as screen D37 of the contents provider, (i.e. the mail order house), together with a delivery date, etc.

[1.4.15.3] Use of Commutation Pass (Check Gate Passage, Manual Start)

Figure 18:
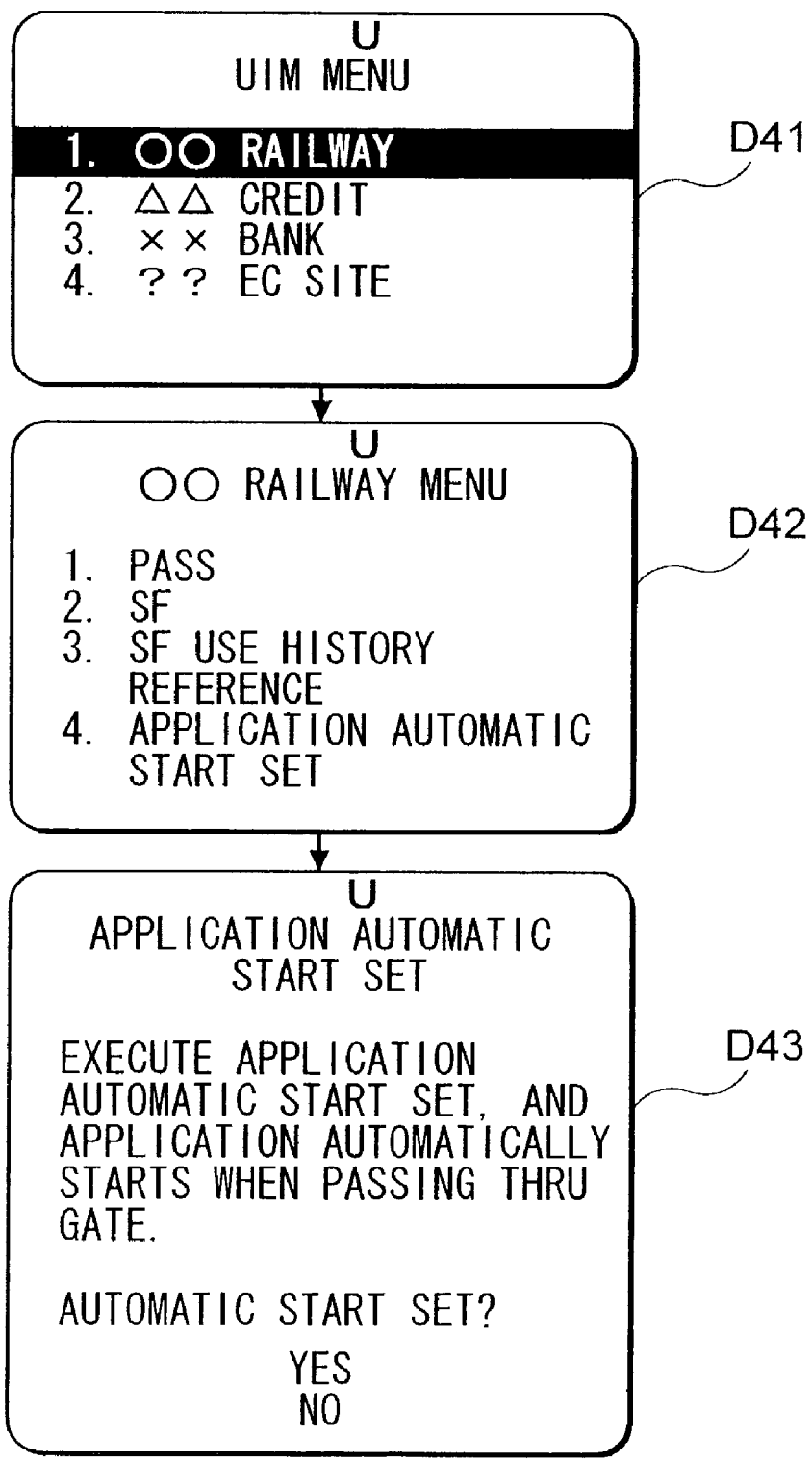
FIG. 18 is a process diagram illustrated as a display screen of the mobile terminal of FIG. 2 for setting an automatic program start.

According to this embodiment, the mobile terminal 11 can be used as a commutation pass by storing an appropriate program in the UIM 12. An example of operation will now be explained. First, the user may depress the UIM button 23. A UIM menu screen, such as screen D41 (FIG. 18) may be displayed on the display section 21. The user may select "RAILWAY" for which the commutation pass is used. As a result, the control unit 30 of the UIM 12 may execute the RAILWAY program in the basic block 40-1. Upon execution, a menu screen, such as screen D42 may be displayed on the display section 21.

When the menu screen is displayed, the user may make a selection, such as "4. SET APPLICATION AUTO. START". An automatic start set confirm screen, such as screen D43 may be displayed thereby prompting the user to select. In the case where the user selects "YES", the automatic start may be set. In the case where the user selection is "NO", the automatic start may not be set.

A gate of the railway company may be equipped with a ticket check reader/writer. Before passing through the gate, the user may perform one or more of the following operations.

Figure 19:
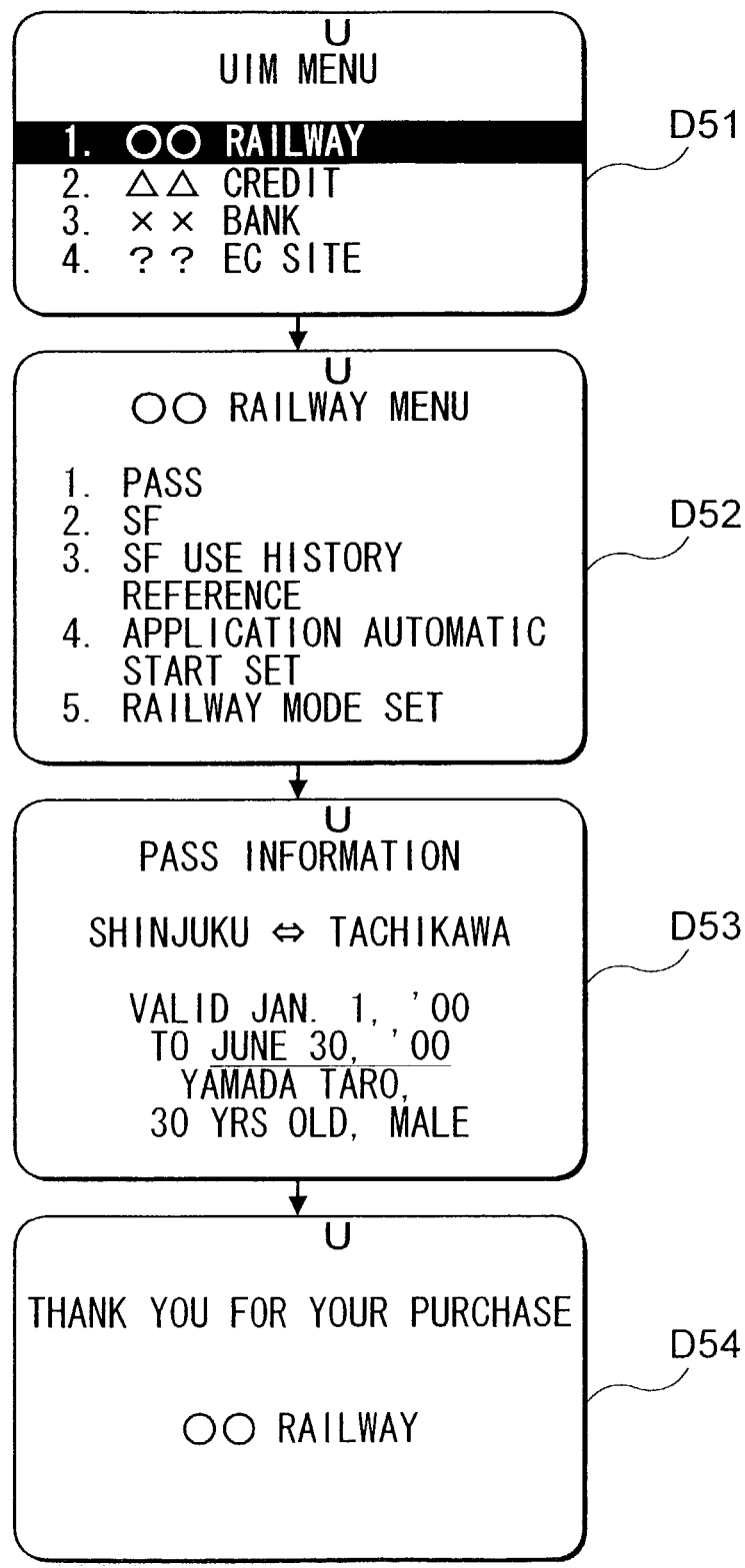
FIGS. 19 and 20 are process diagrams illustrated as a display screen of the mobile terminal of FIG. 2 at the time of using a commutation pass.
Figure 20:
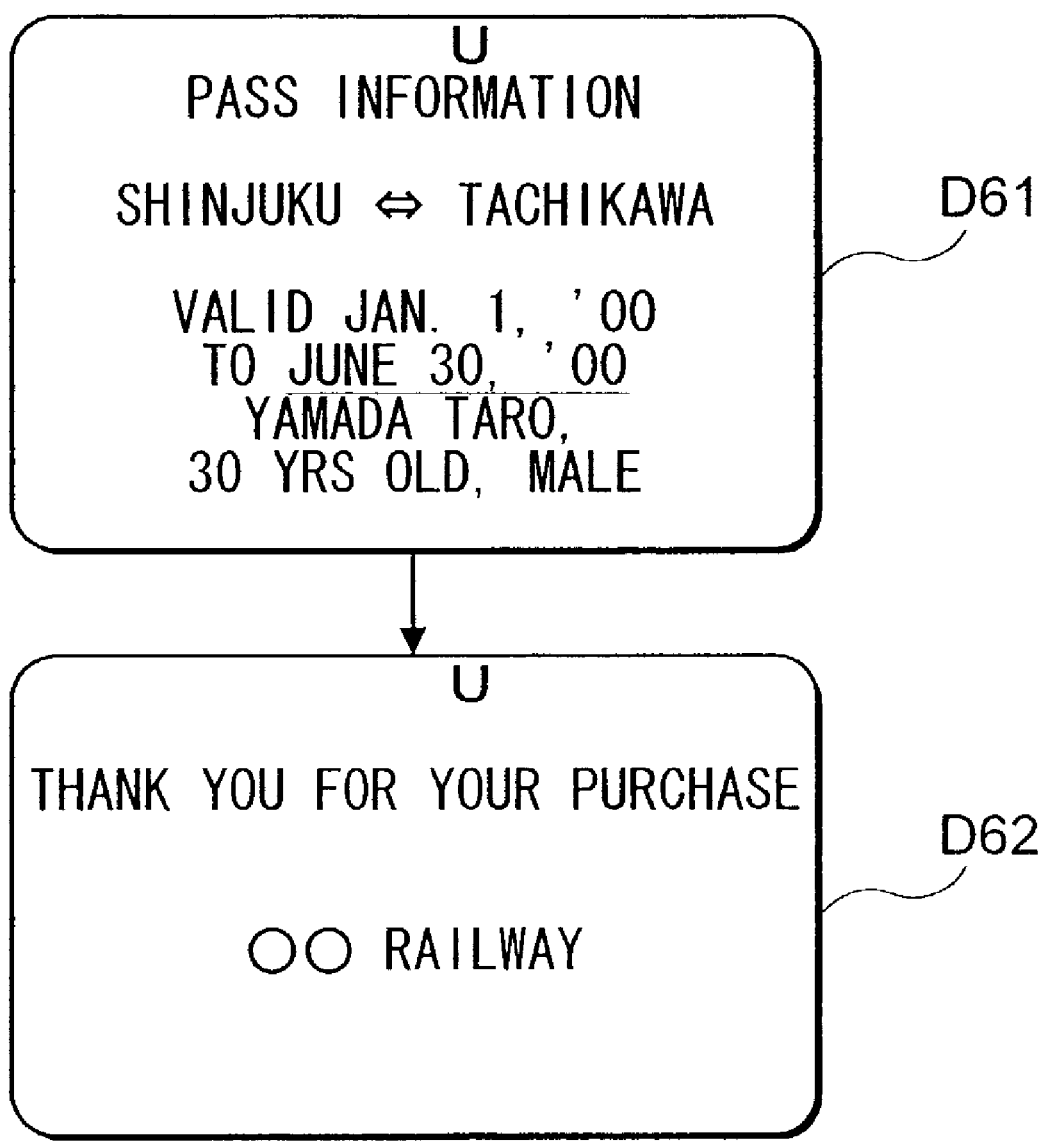

First, the user may depress the UIM button 23. A UIM menu screen, such as screen D51 (FIG. 19) may be displayed on the display section 21. The user may then select "RAILWAY" for which the pass is used. As a result, the control unit 30 of the UIM 12 may execute the RAILWAY program in the basic block 40-1, and display the menu screen, such as screen D52 (FIG. 19) on the display section 21. The user may make a selection, such as "1. PASS" from the menu screen. In response to the selection, a program such as a pass program constituting a part of the RAILWAY program, may be started by the control unit 30. In accordance with the pass program, the control unit 30 may begin communication with the ticket check reader/writer at the gate of the railway company.

If the communication is carried out with a common key crypto system, for example, the pass check process may be performed as follows:

(1) Each party may authenticate the other party.

(2) The ticket check reader/writer may request the mobile terminal 11 to transmit information on the commutation pass.

(3) The mobile terminal 11 may encrypt the pass information using the common key, and transmit the encrypted pass information to the ticket check reader/writer. A pass information display, such as screen D53 (FIG. 19) may be displayed on the display section 21 of the mobile terminal 11.

(4) The ticket check reader/writer may decrypt the received commutation pass information, and, in the case where the user is authenticated, the gate of the railway company may be opened to allow access to a train.

At the same time, a message screen, such as screen D54 for expressing gratitude to the user may be displayed on the display section 21.

The foregoing example relates to a commutation pass. In another example, the mobile terminal 11 may function as a private debit card. In this example, the data area 42 may be updated to indicate value data corresponding to an amount of money remaining after subtraction of any charges the user elects to settle with the mobile terminal 11.

[1.4.15.4] Use of Commutation Pass (Gate Passage: Auto. Start)

When the automatic start confirmation screen, such as screen D43 (FIG. 18) is displayed, the user can select "YES" and the automatic start may be set. When the mobile terminal 11 is set to the automatic start mode and approaches a gate of a railway station, a polling signal transmitted from the ticket check reader/writer may be received by the mobile terminal 11. As a result, the pass program constituting a part of the RAILWAY program may be automatically started by the control unit 30 in the UIM 12. A pass check process that is similar to the manual start may be carried out.

[1.5] Effect of First Embodiment

As described above, according to this embodiment, even where the storage area of the memory 12M is divided to store each program, the mobile terminal 11 may simply provide the communication function to the UIM. Thus, no extra burden may be imposed on the mobile terminal 11. Therefore, the operational functionality of the mobile terminal 11 may not be adversely affected. Also, the program storage, the activation, the deactivation and the deletion may not be carried out by the mobile terminal 11, but instead may be under the control and/or supervision of the distribution management server 16. Thus, user convenience may be improved while at the same time maintaining security.

[2] Second Embodiment

According to the previously described embodiment, a program executed by the UIM 12 may be stored in the basic blocks 40-1 to 40-6 in the same UIM 12. In the second embodiment, however, all the programs that are executed may not necessarily be stored in the basic blocks 40.

[2.1] Configuration of Second Embodiment

Figure 21:
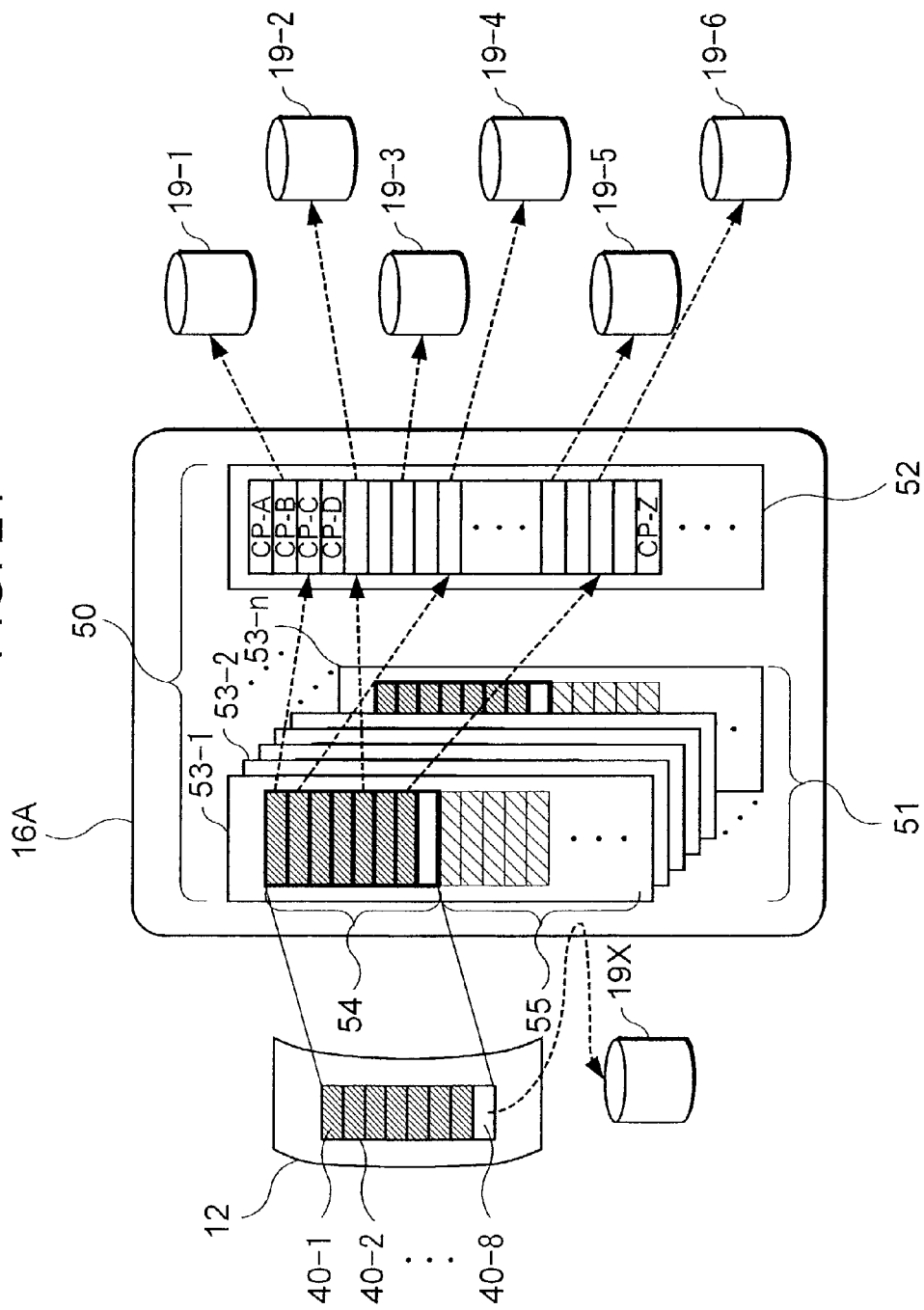
FIG. 21 is a block diagram showing a configuration of a program distribution system according to a second embodiment.

FIG. 21 is a block diagram showing an example configuration of a program distribution system according to another embodiment. A UIM 12, contents servers 19-1 to 19-6 and 19X and a distribution management server 16A are shown in FIG. 21. The distribution management server 16A may correspond to the distribution management server 16 of the first embodiment plus the functions unique to that embodiment. The contents servers 19-1 to 19-6 and 19X may have similar functions to the contents servers 19 of the first embodiment. The system according to this embodiment may also have an authentication server, as in the first embodiment, that is not shown in FIG. 21.

Figure 22:
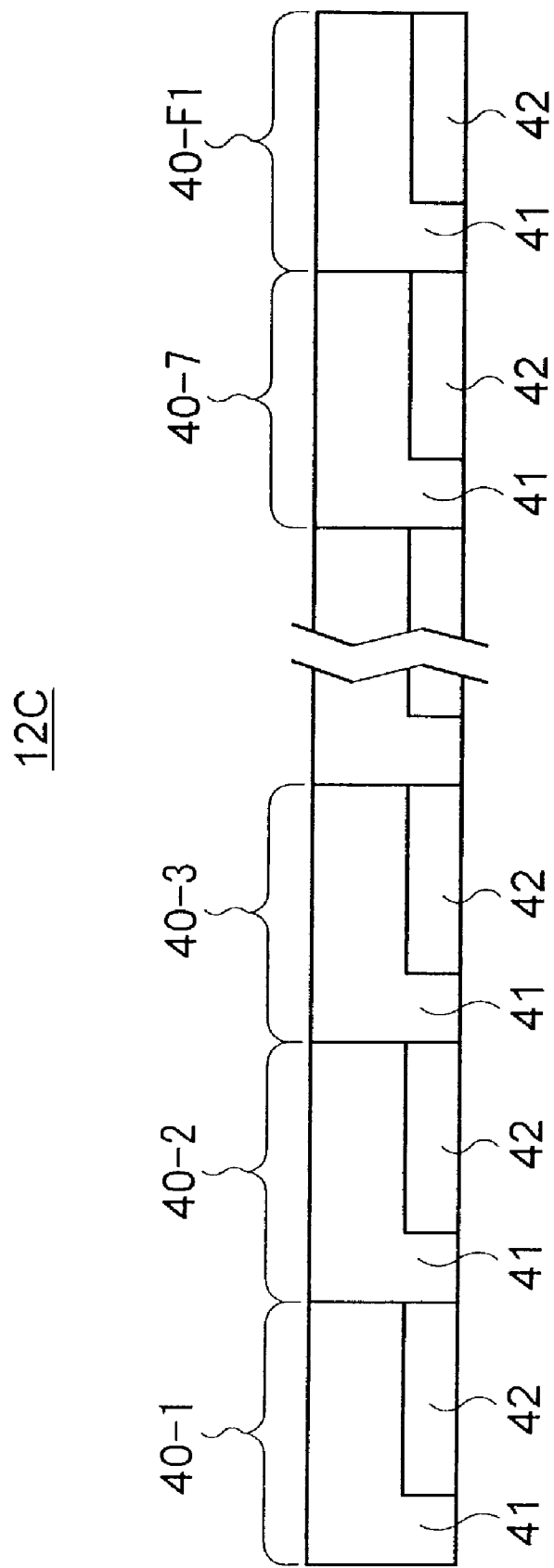
FIG. 22 is a diagram showing a configuration of a memory in a UIM illustrated in FIG. 21.

FIG. 22 is a block diagram illustrating an application area of the mobile terminal 11 illustrated in FIG. 11. The UIM 12 according to this embodiment may include an application area 12C shown in FIG. 22 in place of the application area 12B of the first embodiment. The program storage area 12C may be divided into a plurality of blocks 40, of which one or more may be free basic blocks. In the illustrated example, seven basic blocks 40-1 to 40-7 and one free basic block 40-F1 are depicted.

Each of the basic blocks 40-1 to 40-7 and the free basic block 40-F1 may have a program area 41 and a data area 42. A program, such as application or an applet may be stored in the program area 41. The data area 42, on the other hand, may store data used by the program stored in the program area 41 of the same basic block or free basic block.

In this embodiment, the basic blocks 40-1 to 40-7 and the free basic block 40-F1 may be independent of each other. Accordingly, a program stored in the program area 41 of a given block may not be enabled to access the data area 42 of other blocks 40. This is also the case with the previously discussed first embodiment. A program stored in the program area 41 may not be distributed or deleted without the operation of the distribution management server 16A as an intermediary in the activity. The data area 42, however, may be directly operated through the distribution management server 16A or a local terminal, such as an ATM capable of downloading electronic money to the data area 42. This functionality is also similar to the first embodiment.

Referring now to FIGS. 21 and 22, the distribution of the programs stored in the basic blocks 40-1 to 40-7 may be controlled by the distribution management server 16A. The program stored in the free basic block 40-F1, however, may not be controlled by the distribution management server 16A but may instead be under the user's responsibility and control.

According to the previously discussed first embodiment, a program transmitted from the contents server 19, in accordance with a distribution request from the mobile terminal 11, may be sent to the UIM 12 by the distribution management server 16. The distribution management server 16A according to the second embodiment, on the other hand, may accept a program distribution request from the mobile terminal 11. Upon acquiring a program by accessing a contents server 19, the distribution management server 16A may distributes the program to the UIM 12 of the mobile terminal 11.

The distribution management server 16A according to this embodiment is similar to the distribution management server 16 of the first embodiment in that program distribution from a contents server 19 to a UIM 12 may be relayed and managed. This operation, however, may not be the only function of the distribution management server 16A according to this embodiment. Specifically, the distribution management server 16A may have means for storing a program, or information indicating the location of the program, for the benefit of the user of the UIM 12. In addition, any of the programs stored in the means for storing can be acquired by the user through the distribution management server 16A. In this sense, the distribution management server 16A may exhibit functionality similar to a cache memory for the UIM 12.

In order to manage the program distribution to the UIM 12 and provide functionality similar to a cache memory, the distribution management server 16A may include a distribution management unit 50 (FIG. 21). The distribution management unit 50 may include a user information storage unit 51 and a program information storage unit 52.

The program information storage unit 52 may have stored therein a program or an address, such as a uniform resource locater (URL), corresponding to the program that can be distributed to the UIM 12. The address may be information indicating the address of a specific one of the contents servers 19-1 to 19-6 where a particular program is located. The determination of whether a program or corresponding address information is to be stored in the program information storage unit 52 can be determined based on the storage capacity of the program information storage unit 52. Alternatively, where storage capacity is not an issue, the storage determination may be selected as desired by the contents provider operating the distribution management server 16A.

An exemplary situation that triggers a new program or the corresponding address of the new program to be stored in the program information storage unit 52 is when the mobile terminal 11 of a user sends a program distribution request, and a program or the corresponding address that meets the particular distribution request is not stored in the program information storage unit 52. In such a situation, the program information storage unit 52 may, in response to the request from the mobile terminal 11, access the contents server 19, acquire the program desired by the user and store the program.

The user information storage unit 51 may include n(n>1) individual user information storage units 53-1 to 53-$n$ corresponding to n users utilizing the system. Each individual user information storage unit 53-$k$ (where k=any one of the 1 to n users) may include a real distribution information storage unit 54 and a virtual distribution information storage unit 55.

The real distribution information storage unit 54 of the individual user information storage unit 53-$k$ may store pointer data corresponding to the program distributed to the UIM 12 of the user k. The pointer data may indicate a particular area in the program information storage unit 52 where the program or the corresponding address is stored. The availability of the real distribution information storage unit 54 may make it possible for the distribution management server 16A to immediately redistribute any program previously distributed in the basic blocks 40-1 to 40-7 of the UIM 12. For example, if a program stored in one of the basic blocks 40-1 to 40-7 of the UIM 12 is erased, the erased program may be redistributed to another of the basic blocks 40-1 to 40-7 by changing the pointer data.

The virtual distribution information storage unit 55 of the individual user information storage unit 53-*k*, on the other hand, may store pointer data corresponding to an available program. An available program may not actually be distributed to the UIM 12 of the user k, but can be immediately distributed to the UIM 12 of the user k who is desirous of having such a program. The user of the UIM 12 can receive the following example services by use of the virtual distribution information storage unit 55.

(a) The pointer data of a program that is to be distributed to the UIM 12 may be provisionally stored in the virtual distribution information storage unit 55. The user may send a request to the distribution management server 16A using the mobile terminal 11 to distribute the program. The user may send the request whenever distribution of the program stored in the virtual distribution information storage unit 55 is desired. The distribution management server 16A may read the pointer data of the requested program from the virtual distribution information storage unit 55. The distribution management server 16A may then acquire and distribute the program specified by the pointer data to the UIM 12 of the mobile terminal 11 operated by the user. In this case, the pointer data of the program distributed to the UIM 12 may be moved from the virtual distribution information storage unit 55 to the real distribution information storage unit 54.

(b) The number of the basic blocks 40 in the UIM 12 may be limited. Therefore, it may happen that all the basic blocks 40 are occupied by previously distributed existing programs, and no basic block 40 is available for storing a program to be newly distributed. In such a case, the distribution management server 16A may read existing pointer data from a storage area corresponding to a selected basic block 40 in the UIM 12. For purposes of example, the selected basic block is basic block 40-X where an existing program is stored (where "X" may be any one of the basic blocks 40 in the UIM 12). The storage area may be one of the storage areas in the real distribution information storage unit 54.

The existing pointer data read from basic block 40-X may be transferred to the virtual distribution information storage unit 55. The program to be newly distributed may be sent to the UIM 12 and written in the basic block 40-X, thereby overwriting the existing program previously stored in basic block 40-X. In addition, the pointer data of the newly distributed program may be written in the storage area corresponding to the basic block 40-X in the real distribution information storage unit 54. Thus, the existing pointer data in the storage area corresponding to the basic block 40-X is overwritten. This process may make it possible to acquire a new program by a distribution request and store the new program in a basic block 40 even when the basic blocks 40 are fully occupied. With regard to the program overwritten in one of the basic blocks 40, a request may be given to the distribution management server 16A to again distribute the overwritten program and the process described in (a) above can be carried out.

Referring still to FIGS. 21 and 22, an example of the function of the distribution management server 16A with regard to the free basic block 40-F1 will now be given. As already described, the distribution management server 16A may not manage the program distribution for the free basic block 40-F1. Instead, the user, by operating the mobile terminal 11, may freely register or delete a program in the free basic block 40-F1.

The real distribution information storage unit 54 of the individual user information storage unit 53 may have a storage area corresponding to the free basic block 40-F1 of the UIM 12. In this area, however, no pointer data of a program may be stored. Instead, data including the number of times a program or the corresponding address is registered in, or deleted from, the basic block 40-F1 may be stored. In the case where nothing is stored in the free basic block 40-F1, data so indicating ("Null" data, etc.) may be stored in this area.

A program that is stored in the free basic block 40-F1 of the UIM 12 may be deleted. Unlike programs stored in the basic blocks 40-1 to 40-7, a program deleted from the free basic block 40-F1 may remain as it is until registered again by the user. The user may also temporarily change the program in the free basic block 40-F1 to another program. Such changes can be made by the user himself by writing and rewriting programs into the free basic block 40-F1. The distribution management server 16A may not carry out the billing process even if a program is stored in the free basic block 40-F1.

The free basic block 40-F1 may also be configured to be handled the same way as the basic blocks 40-1 to 40-7 as desired by the user. Specifically, in this example the seven basic blocks 40-1 to 40-7 and one free basic block 40-F1 can be configured for use as eight basic blocks 40-1 to 40-8. In such a case, information indicating that the free basic block 40-F1 has been changed to the basic block 40-8 may be written by the distribution management server 16A in the system area 12A (FIG. 4) of the UIM 12. Also, the area in the real distribution information storage unit 54 that has previously been handled as an area corresponding to the free basic block 40-F1, can be handled by the distribution management server 16A as an area corresponding to the basic block 40-8. Using this area, the same management as that of the basic blocks 40-1 to 40-7 may be started. The basic block that has been changed to the basic block 40-8 by the user in this way can be restored to the free basic block 40-F1 again by the user himself. In this example, the basic blocks 40-1 to 40-7, may not be changed to free basic blocks.

[2.2] Configuration of Distribution Management Server

Figure 23:
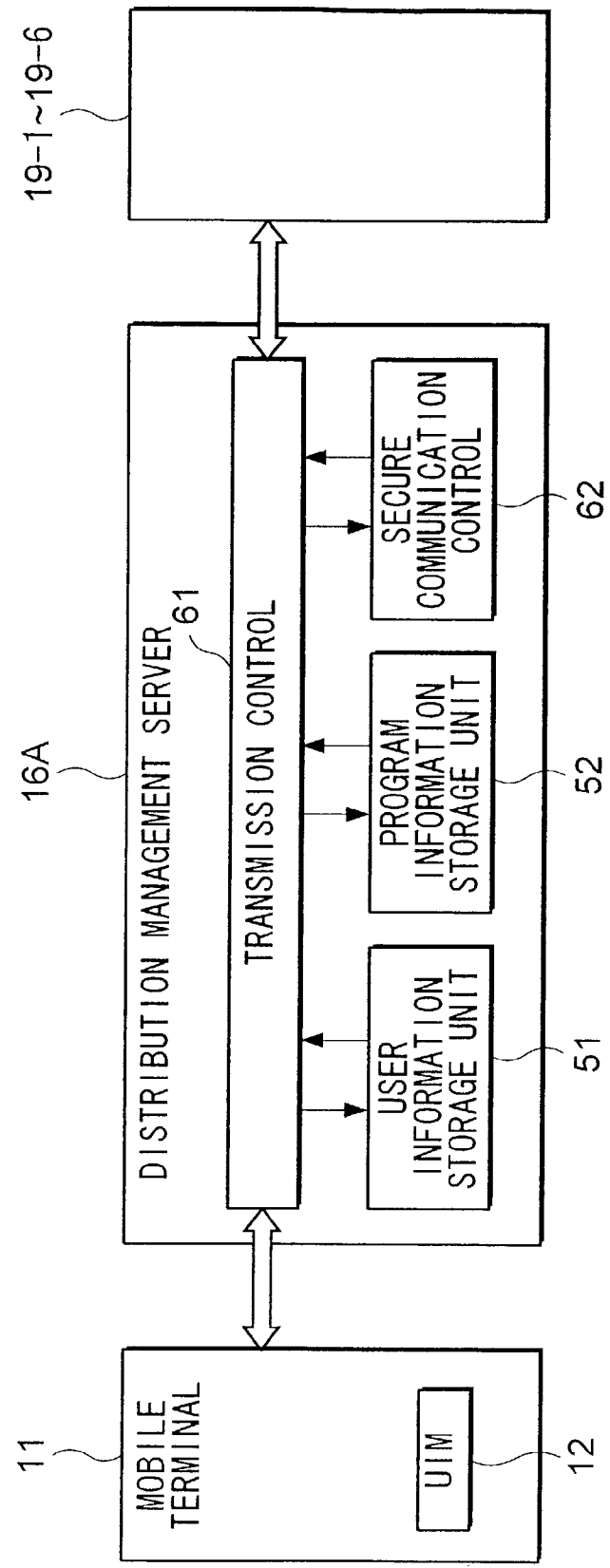
FIG. 23 is a block diagram showing a configuration of a distribution management server illustrated in FIG. 21.

FIG. 23 is an example configuration of the distribution management server 16A. The distribution management server 16A may be configured to include a transmission control unit 61, the user information storage unit 51 described above, the program information storage unit 52 described above and a secure communication control unit 62. The transmission control unit 61 may control transmissions between the external contents servers 19-1 to 19-6 and/or between the mobile terminals 11 (including the transmission between the contents servers 19-1 to 19-6 and the mobile terminals 11). The transmission control unit 61 may also control transmissions between the user information storage unit 51, the program information storage unit 52 and the secure communication control unit 62. Further, the transmission control unit 61 may control the distribution management unit 50 (FIG. 21), the user information storage unit 51, the program information storage unit 52 and the secure communication control unit 62 on the one hand, and request the execution of various processes in the distribution management unit 50, the user information storage unit 51, the program information storage unit 52 and the secure communication control unit 63 on the other hand.

The program information storage unit 52 may function substantially as a portal site for a program permitted to be distributed to the basic blocks 40-1 to 40-7 of the UIM 12. The secure communication control unit 63 may authenticate information (an encrypted program, etc.) sent from the contents servers 19-1 to 19-6. In addition, the secure communication control unit 63 may hold a public key paired with a private key held by each UIM 12. The secure communication control unit 63 may also manage the issue of the public keys for the contents servers 19-1 to 19-6.

[2.3] Operation of Second Embodiment

[2.3.1] Registration in User Information Storage Unit

In the example shown in FIG. 21, the contents servers 19-1 to 19-6 may be under the control of the distribution management server 16A. A user desirous of using a program, such as an applet, stored in any of the contents servers 19 may be required to register the particular program in the user information storage unit 51 of the distribution management server 16A.

Figure 24:
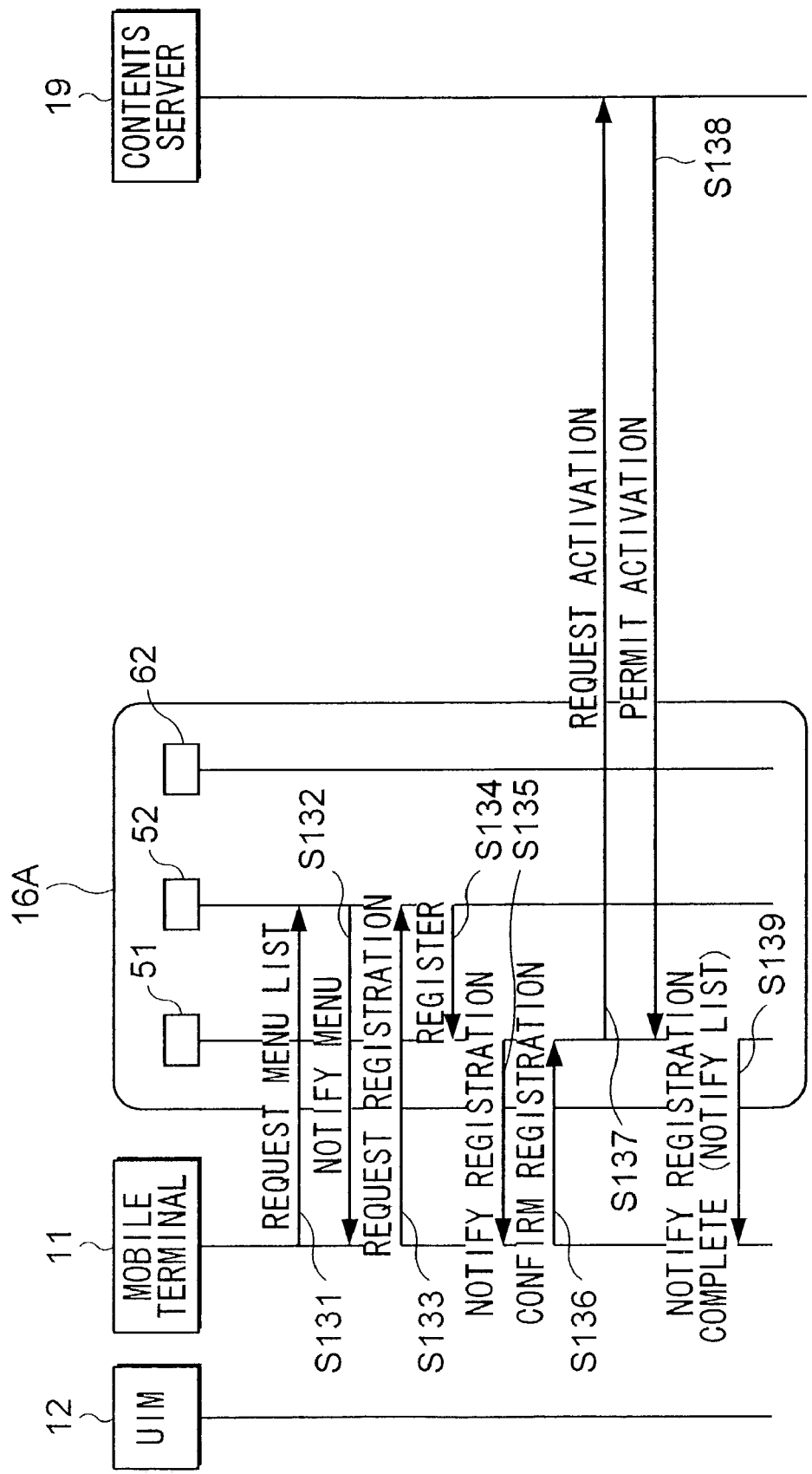
FIG. 24 is a sequence diagram showing the process for registration in a user information storage unit in the program distribution system illustrated in FIG. 21.

FIG. 24 is an example registration process performed with the second embodiment illustrated in FIGS. 21–23 where information is stored in a user information storage unit 51 of the distribution management server 16A. In FIG. 24, the user may first send from the mobile terminal 11 to the distribution management server 16A a request for a menu list of programs that can be registered. The request may be sent to the program information storage unit 52 through the transmission control unit 61 of the distribution management server 16A (step S131). The program information storage unit 52 that has received the request may prepare a menu list of all the programs that can be registered. Specifically, the menu list may include all the programs where a program itself, or an address of the program is stored in the program information storage unit 52. The menu list may be transmitted through the transmission control unit 61 to the mobile terminal 11 (step S132).

The menu list may be received by the mobile terminal 11 and displayed on the display section 21 (FIG. 2) of the mobile terminal 11. The user may then acquire, by operating the operating section 22 (FIG. 2), a comment on the desired program from the distribution management server 16A. The comment may be a description of the program displayed on the display section 21.

The user may select a program and request distribution of the program by operating the operating section 22. The mobile terminal 11 may then transmit a registration request to the program information storage unit 52 of the distribution management server 16A (step S133). The registration request may include information specifying the requested program. The program information storage unit 52 may register the program requested by the user in the user information storage unit 51 based on the program registration request (step S134).

An example of the operations in step S134 will now be described in detail. In this example, the registration request is issued from a mobile terminal 11 in which a UIM 12 of a given user k is built or mounted. The program information storage unit 52 may identify the program requested by the user k based on the registration request. The program information storage unit 52 may also determine the pointer data. The pointer data may specify the internal area of the program information storage unit 52 where the address information indicating the location of the program or the program itself is stored. Once the pointer data of the program requested by the user is obtained, the program information storage unit 52 may access the contents stored in each area of the real distribution information storage unit 54. The real distribution information storage unit 54 includes the individual user information storage unit **53-*k* corresponding to the user k. Thus, the program information storage unit 52 may determine a basic block 40-X (where "X" is any one of the basic blocks 40 in the UIM 12) available for storage among the basic blocks 40 of the UIM 12** of the user k.

The pointer data of the program requested by the user may be registered in the area of the real distribution information storage unit 54 corresponding to the basic block 40-X (step S134). It may be that the UIM 12 of the user k has no basic block 40-X available for storage. In such a case, the program information storage unit 52 may register the pointer data of the program requested in the virtual distribution information storage unit 55. The storage location in the virtual distribution information storage unit 55 may be designated by user k, or may be set automatically.

A menu list displayed on the mobile terminal 11 may not include a program desired by the user. In such a case, the user can operate the mobile terminal 11 to request the program information storage unit 54 to access a desired contents server 19. In this case, the program information storage unit 54, in compliance with the user request, may acquire a desired program or a corresponding address of the desired program from the contents server 19. The program information storage unit 54 may hold the desired program in an unoccupied area in the program information storage unit 54. In the process, the pointer data indicating the location of the desired program or corresponding address may be registered in the real distribution information storage unit 54 in the same manner as previously described.

Upon complete registration of the desired program requested by the user, the distribution management server 16A may start the billing process for the user and/or the contents provider that has distributed the particular program. The user information storage unit 51 may then send a registration notice to the mobile terminal 11 through the transmission control unit 61 (step S135). The mobile terminal 11, upon receipt of the registration notice, may send a registration acknowledgment to the distribution management server 16A (step S136). The user information storage unit 51 may receive the registration acknowledgment through the transmission control unit 61 from the mobile terminal 11. In response to the registration acknowledgment, the user information storage unit 51 may determine the contents provider 19 storing the program identified by the pointer data registered for the user k. The user information storage unit 51 may then send an activation permission request to the contents server 19 (step S137).

In order to approve a program utilization contract, the contents server 19 may receive the activation permission request, and send an activation permission to the user information storage unit 51 (step S138). Based on the activation permission, the user information storage unit 51 may permit the use of the pointer data. The pointer data may be stored in an area of the real distribution information storage unit 54 of the individual user information storage area **53-*k* for the user k that corresponds to the basic block 40-X**.

The user information storage unit 51 may send a registration completion notice indicating that the registration in the mobile terminal 11 is completed (step S139). The registration completion notice may include a registration list. The registration list may provide a list of the programs with corresponding pointer data registered in the user information storage unit 51. The user can confirm the registration list from the display section 21 (FIG. 2) of the mobile terminal 11.

[2.3.1.1] Registration of UIM in Basic Block (the Contents Server Holding the Program)

Figure 25:
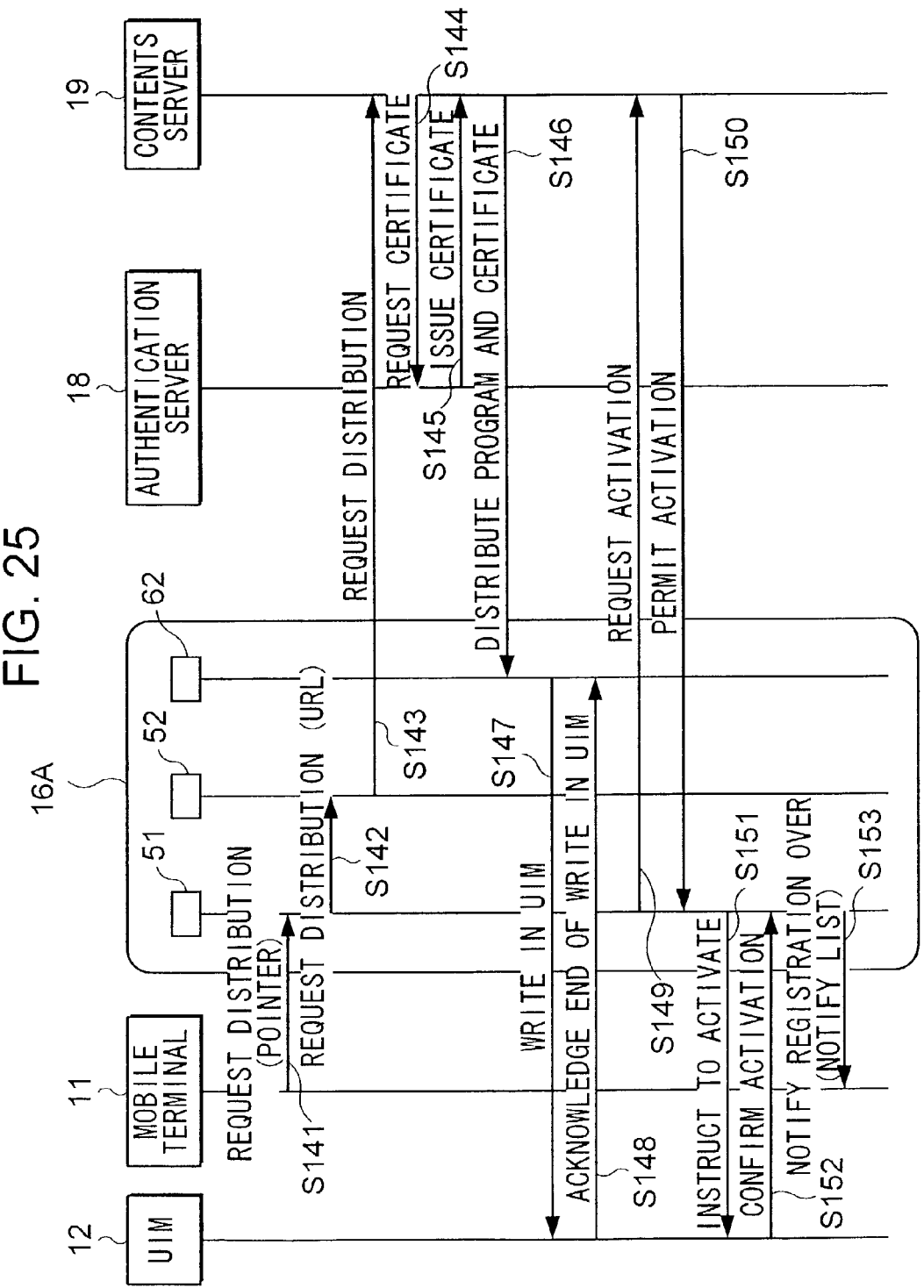
FIGS. 25 and 26 are sequence diagrams showing the operation of registering a program registered in a user information storage unit in the program distribution system illustrated in FIG. 21.

FIG. 25 is an operational example of registering a program registered in a user information storage unit as previously discussed with reference to FIG. 24, in one of the basic blocks 40 of the UIM 12. In this example, a desired program is initially stored at a contents server 19. A user k who has received the previously discussed registration list can request that a program be distributed and written in the UIM 12. With reference to FIG. 25, this operation will be explained.

The user k may perform an operation to select a desired program for distribution from the registration list. A distribution request containing the pointer data in the registration list may be sent from the mobile terminal 11 to the user information storage unit 51 of the distribution management server 16A (step S141). The pointer data may indicate the position number in the registration list where the selected program is located.

The user information storage unit 51, upon receipt of a distribution request from the mobile terminal 11 of the user k, may read the pointer data. The pointer data may specify the location where the selected program itself is stored, or the address of the selected program requiring distribution. The pointer data may be read from that area of the real distribution information storage unit 54 of the individual user information storage unit 53-k that corresponds to the pointer data in the registration list contained in the particular distribution request. The distribution request containing the pointer data may now be sent to the program information storage unit 52 (step S142).

The program information storage unit 52 may access the area specified by the pointer data in the particular distribution request. In the case where the address, such as a URL, of the program is stored in the area, the program distribution may be requested from the contents server 19 using the address (step S143). The contents server 19, upon receipt of this distribution request, may request the authentication server 18 to issue a public key for the distribution management server (step S144). In the case where the contents server 19 is permitted to write in the UIM 12, the authentication server 18 may issue the public key for the distribution management server to the contents server 19 (step S145).

The contents server 19 may encrypt the program using the public key for the distribution management server 16A. In addition, the contents server 19 may distribute the encrypted program and a certificate to the secure communication control unit 62 of the distribution management server 16A (step S146). The secure communication control unit 62 may have stored therein a distribution management server private key. The distribution management server private key may be paired with the distribution management server public key. Using the private key and the certificate, the secure communication control unit 62 may decrypt the encrypted program. Where the decryption is successful, a program written in a common text is obtained.

The secure communication control unit 62 may acquire the UIM public key corresponding to the destination UIM 12 from the authentication server 18. Using the UIM public key, the secure communication control unit 62 may encrypt and then send the program to the UIM 12. In the UIM 12, the program may be decrypted using the UIM private key paired with the UIM public key. Once decryption is successful, a program in a common text may be obtained.

The UIM 12 may write this program in the basic block 40-X (step S147). The UIM 12 may determine the basic block 40-X by techniques similar to those used by the program information storage unit 52 in the distribution management server 16A. In step S147, therefore, the same basic block 40-X may be obtained as determined in step S134 of FIG. 24. Alternatively, the registration completion notice transmitted from the distribution management server 16A in step S139 of FIG. 24 may contain the information specifying the unoccupied basic block 40-X determined in step S134. Thus, in step S147 of FIG. 25, the program may be stored in the UIM 12 in the basic block 40-X specified by the particular information.

The UIM 12, at the end of the program write operation, may transmit a write end notice to the secure communication control unit 62 of the distribution management server 16A (step S148). The write end notice may contain information specifying the basic block 40-X where the program is written. The secure communication control unit 62 of the distribution management server 16A may receive the write end notice. In response, the user information storage unit 51 may send an activation request to the contents server 19. The activation request may be an order to request permission for execution of the program written in the UIM 12 (step S149).

The contents server 19 that has received this activation request may send an activation permission to the user information storage unit 51 (step S150). The user information storage unit 51 that has received the activation permission may send an activation instruction to the UIM 12 (step S151). In the UIM 12, upon receipt of the activation instruction, the activation flag corresponding to the basic block 40-X in which the program is written toggles from "0" to "1." When the activation flag becomes "1", execution of the program in the basic block 40-X becomes possible.

The UIM 12, at the end of the program activation, may transmit an activation acknowledgment notice to the user information storage unit 51 of the distribution management server 16A (step S152). The activation acknowledgment notice may indicate the end of the program activation. Information specifying the program (for example, the information specifying the basic block 40-X) may be transmitted with the activation acknowledgement notice.

The user information storage unit 51 may receive the activation acknowledgment notice from the UIM 12 of the user k. The user information storage unit 51 may then determine an area of the real distribution information storage unit 54 of the individual user information storage unit 53-k corresponding to the basic block 40-X. In this area, the pointer data corresponding to the program that was written into the basic block 40-X may already have been written in the UIM 12 of the user k. In addition, information to the effect that the activation is complete may be written to coexist with the pointer data. As the result of this operation, the distribution management server 16A can determine whether the activation has been performed for the basic blocks 40 of all the UIMs 12 by accessing each area of the user information storage unit 51.

Following the operation to write the information when the activation is complete, the user information storage unit 51 may notify the mobile terminal 11 that the registration is complete (step S153). The notification to the mobile terminal 11 may be in the form of a program list. The user information storage unit 51 may subsequently notify the mobile terminal 11 that the program can be executed, while at the same time ending the process. The distribution management server 16A may also notify the contents server 19 that the activation of the program is complete.

[2.3.1.2] Registration of a UIM Basic Block (in the Case where the Program is Stored in the Distribution Management Server)

Figure 26:
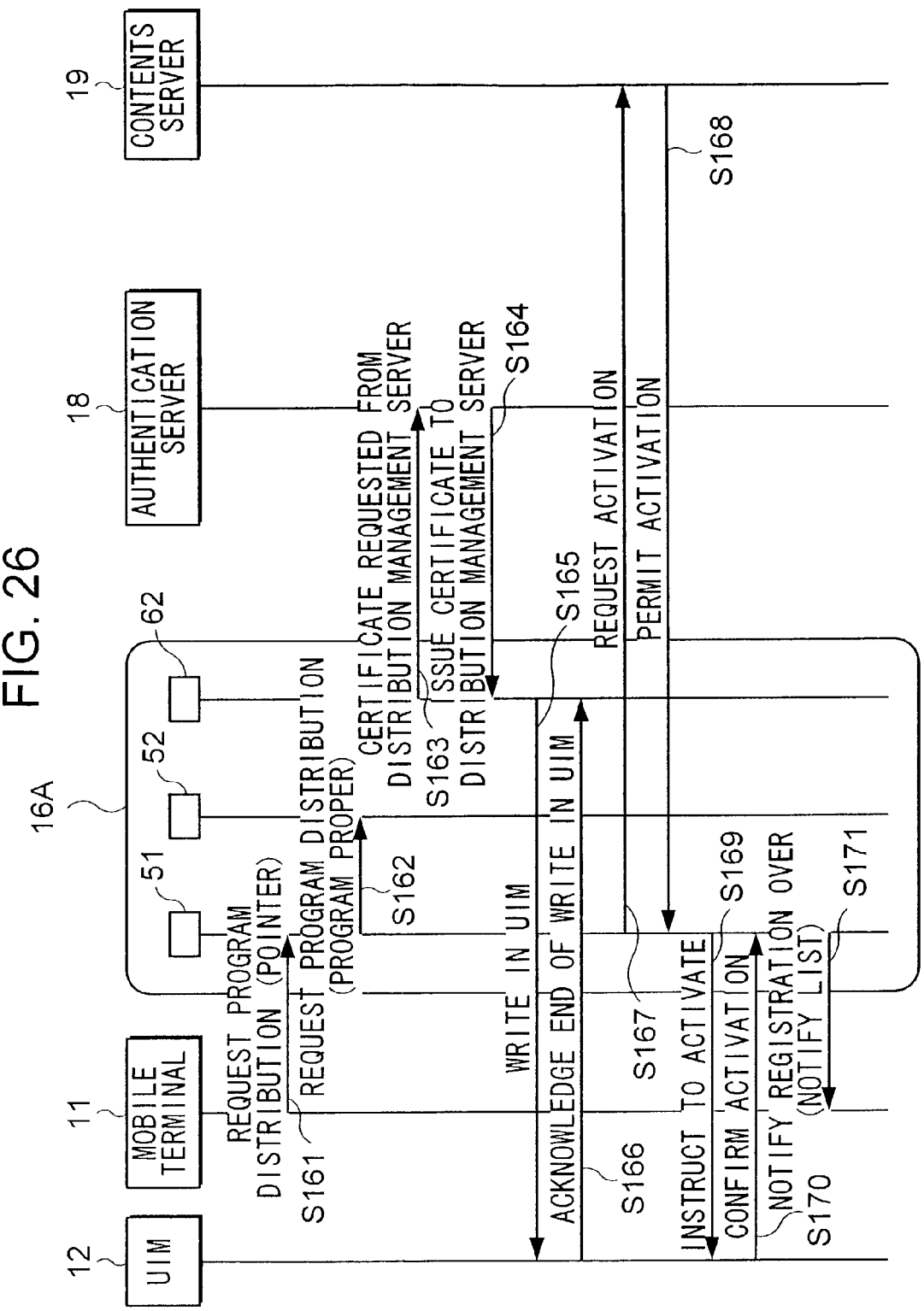

FIG. 26 is an example of operation where the program desired by the user to be distributed is stored in the distribution management server 16A. In contrast, in the previously discussed example of operation shown in FIG. 25, the program desired by the user to be distributed was stored in the contents server 19.

Referring to FIG. 26, the user may access the registration list received from the distribution management server 16A, and perform an operation to select a desired program as previously discussed. A distribution request that includes a pointer from the registration list corresponding to the selected program may be sent from the mobile terminal 11 to the user information storage unit 51 of the distribution management server 16A (step S161). The user information storage unit 51, upon receipt of the distribution request from the mobile terminal 11 of the user k, may read the pointer data. As previously discussed, the pointer data may specify the place of storage of the address of the selected program or the selected program itself. The pointer data may be read from that area of the real distribution information storage unit 54 of the individual user information storage unit 53-$k$ that was identified by the pointer from the registration list that was included in the distribution request. The distribution request containing the pointer data may be sent to the program information storage unit 52 (step S162).

The program information storage unit 52 may access the area designated by the pointer data in the distribution request. In the case where the program itself is stored in the particular area, the secure communication control unit 62 may request the authentication server 18 to issue a certificate (step S163). In other words, the secure communications control unit 62 may send a request for a UIM public key. The UIM public key may be used to encrypt the program as previously discussed. The encrypted program may then be sent to the UIM 12 of the user k.

If the program corresponding to the distribution request is a program permitted to be written into the UIM 12, the authentication server 18 may send the UIM public key to the secure communication control unit 62 (step S164). The secure communication control unit 62 may receive the UIM public key. Upon determination that the key is legitimate, the secure communication control unit 62 may encrypt the program to be distributed. The program may be encrypted using the UIM public key. As a result, the program includes a certificate.

When the user performs an operation at the mobile terminal 11 to permit distribution of the program, the secure communication control unit 62 of the distribution management server 16A may send the program that includes the certificate to the UIM 12 of the mobile terminal 11 (step S165). The UIM private key paired with the UIM public key may be stored by the UIM 12. Using the UIM private key, the UIM 12 may decrypt the program. The decrypted program may then be written into one of the basic blocks 40. The subsequent operation is similar to the corresponding operation shown in FIG. 25. Accordingly, in FIG. 26, steps S166 to S171 may correspond to steps S148 to S153 in FIG. 25.

[2.3.1.3] Registration in a Basic Block of the UIM when the Program is Stored in the Distribution Management Server, and the UIM Public Key is Stored in the Secure Communication Control Unit The mobile terminal 11 may send a distribution request to the distribution management server 16A. The UIM public key of the UIM 12 to which the program is to be distributed may be stored in the secure communication control unit 62 of the distribution management server 16A. Such a situation may occur, for example, when different programs are distributed to the same UIM 12 within a short time.

Figure 27:
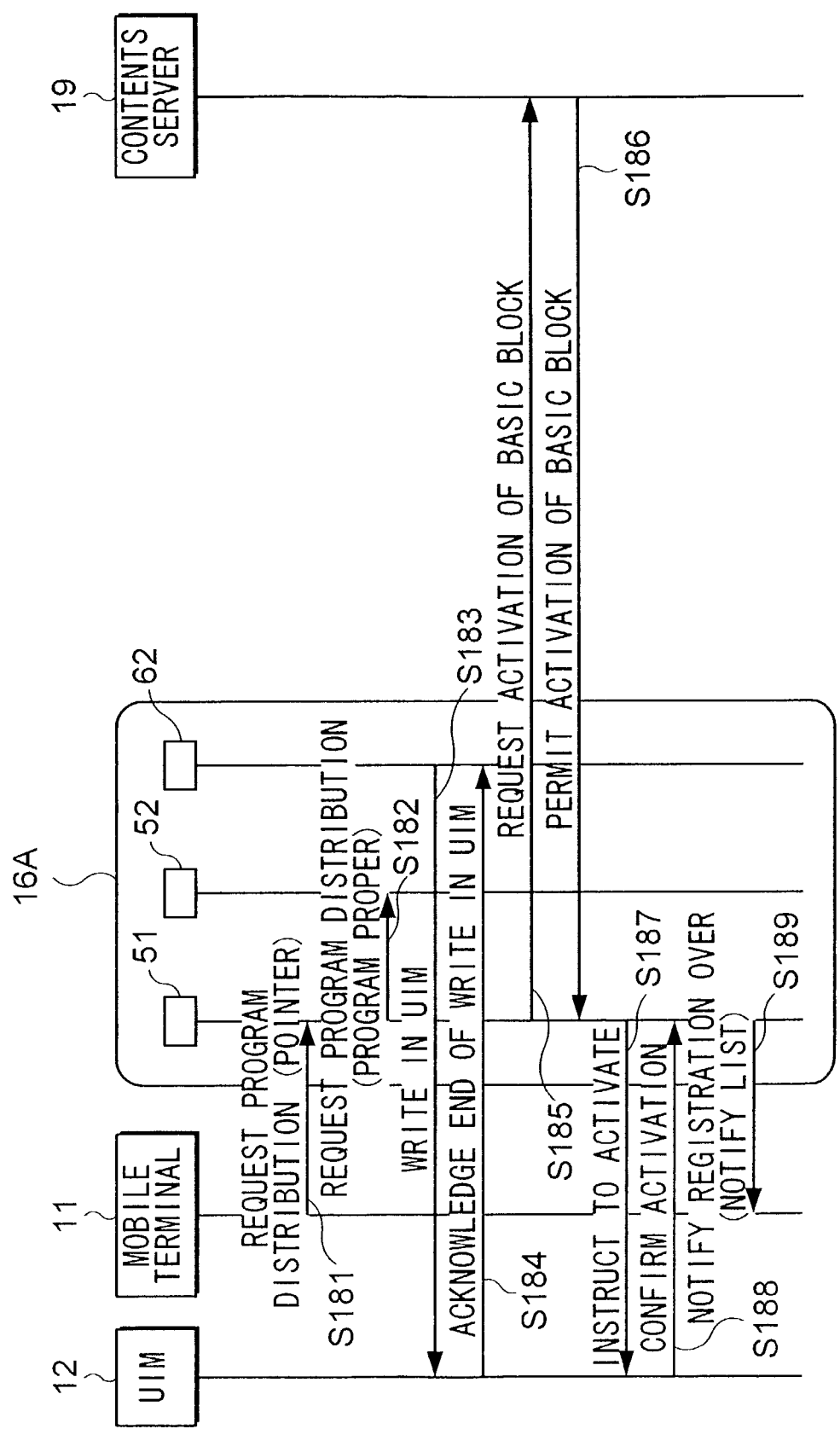
FIGS. 27 and 28 are sequence diagrams showing the operation of registering a program registered in a user information storage unit in the program distribution system illustrated in FIG. 21.

FIG. 27 shows an example of the operation performed in such a case. In this operation example, when a program corresponding to the distribution request is found, the program may be encrypted using the UIM public key held in the secure communication control unit 62. The encrypted program may then be written in the UIM 12. The operation shown in FIG. 27 is similar to the operation shown in FIG. 26 in many respects. There are, however, differences. For example, the operations corresponding to steps S163 and S164 illustrated in FIG. 26 for acquiring the UIM public key from the authentication server 18 are missing. Steps S181, S182, S183 to S189 in FIG. 27 may be similar to steps S161, S162, S165 to S171, respectively, in FIG. 26.

[2.3.1.4] Program Registration in the UIM Free Basic Block

Figure 28:
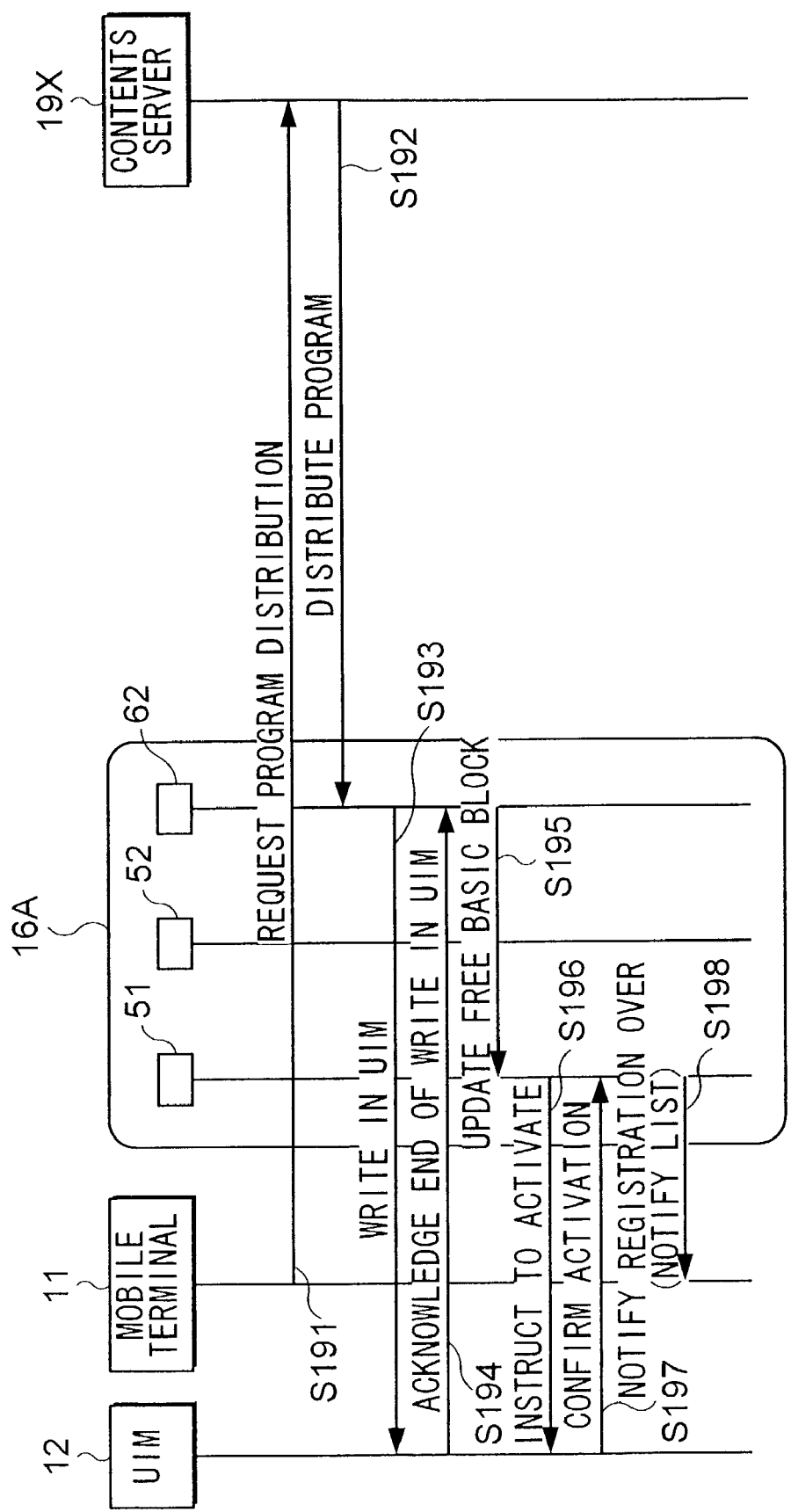

FIG. 28 is an example operation where the user, by operating the mobile terminal 11, can register a program in the free basic block 40-F1 of the UIM 12. The user may operate the mobile terminal 11 so that the desired contents server 19X is accessed and a request for distributing the desired program is sent to the UIM 12 of the user (step S191). The contents server 19X that received the distribution request may distribute the requested program to the secure communication control unit 62 of the distribution management server 16A (step S192).

The user may perform the operation to permit distribution of the desired program to the free basic block 40-F1. Information indicating the user's approval of the distribution may be sent from the mobile terminal 11 to the distribution management server 16A. The secure communication control unit 62 may then distribute the program to the UIM 12 of the mobile terminal 11 (step S193). The distributed program may be sent in encrypted form or without encryption. The UIM 12 may write the distributed program into the free basic block 40-F1.

At the end of the program write operation, the UIM 12 may transmit a write end notice to the distribution management server 16 (step S194). The user information storage unit 51 of the distribution management server 16A may receive the write end notice from the UIM 12 of the user k. Upon receipt of the write end notice, the user information storage unit 51 may update information that includes the number of distribution sessions stored in the area of the user individual information storage unit 53-$k$ corresponding to the free basic block 40-F1 (step S195). Once the update operation is completed, the user information storage unit 51 may send an activation instruction for the program written in the free basic block 40-F1 to the UIM 12 (step S196). The UIM 12, in compliance with this instruction, may activate the program, and transmit to the user information storage unit 51 of the distribution management server 16 an activation response notice indicating that the activation of the program in the free basic block 40-F1 is complete (step S197).

The user information storage unit 51, upon receipt of the activation response notice from the UIM 12 of the user k, may register that the activation is complete. The activation complete information may be stored in the area of the individual user information storage unit 53-*k* corresponding to the free basic block 40-F1. The user information storage unit 51 may notify the mobile terminal 11 that the registration is complete by transmitting the program list, thereby terminating the process (step S198).

[2.3.1.5] Program Deletion from the User Information Storage Unit

Figure 29:
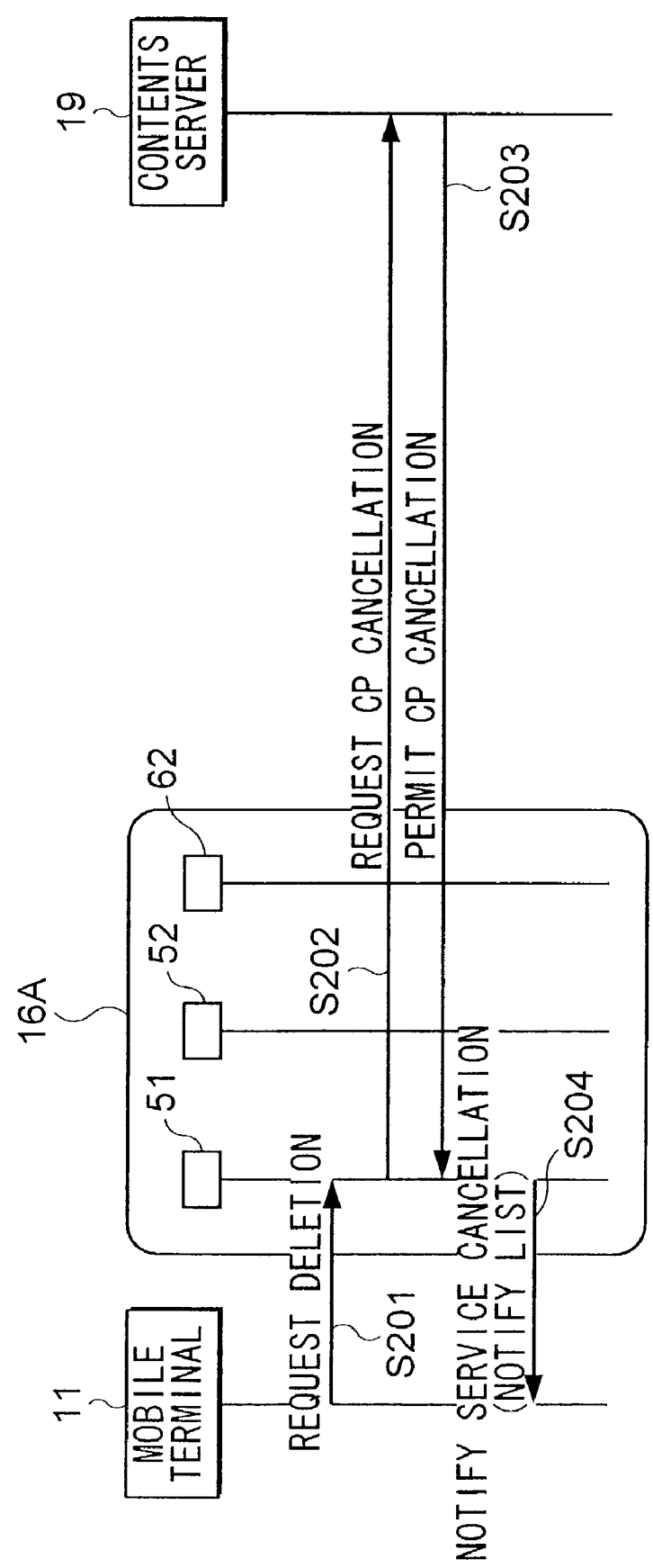
FIG. 29 is a sequence diagram showing the operation of deleting a program registered in a user information storage unit in the program distribution system illustrated in FIG. 21.

FIG. 29 is an example operation to delete a program registered in the user information storage unit 51. The user can display on the display unit 21 a program list received from the distribution management server 16A. The user may identify a program on the program list to be deleted in the distribution management server 16A. A program registration delete request containing information identifying the program to be deleted may be sent to the user information storage unit 51 of the distribution management server 16A (step S201).

If the program identified for deletion has already been deleted from any one of the basic blocks 40-1 to 40-7 of the UIM 12, the user information storage unit 51 may send a cancellation request to the contents server 19 from which the particular program is distributed (step S202). The cancellation request may indicate the instructions of the user to cancel utilization of the program. If the program to be deleted remains undeleted in any one of the basic blocks 40-1 to 40-7 of the UIM 12, the process to delete the program from the basic blocks 40-1 to 40-7, described later, is carried out at the same time under the guidance of the distribution management server 16A. The contents server 19, upon receipt of the cancellation request, may send a cancel permission notice to the user information storage unit 51 of the distribution management server 16A (step S203). The user information storage unit 51, upon receipt of the cancel permission notice, may delete the information on the program requested to be deleted in step S201 to cancel the service. In addition, following deletion of the information, the user information storage unit 51 may send a registered program list to the mobile terminal 11 (step S204).

[2.3.16] Program Deletion from UIM Basic Block

Figure 30:
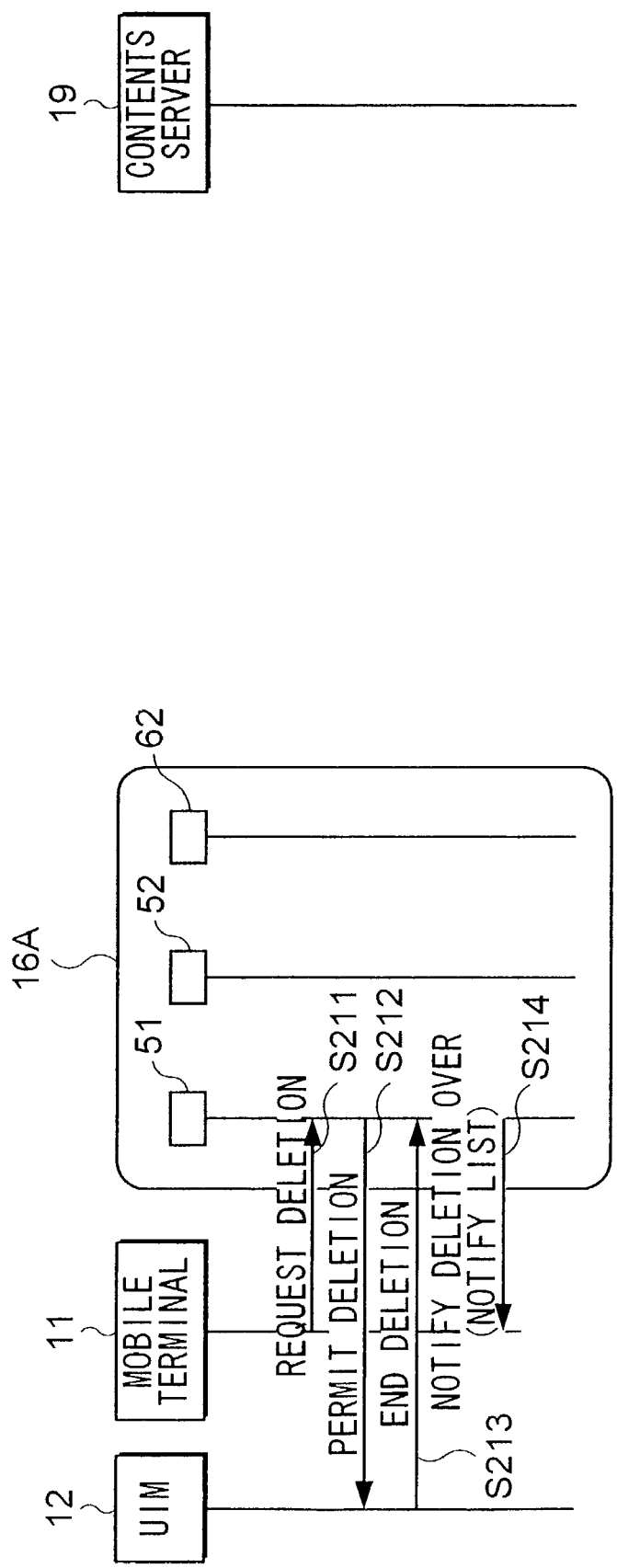
FIG. 30 is a sequence diagram showing the operation of deleting a program registered in the basic blocks of a UIM in the program distribution system illustrated in FIG. 21.

FIG. 30 is an example operation to delete a program from the basic blocks 40-1 to 40-7 of the UIM 12. The user may perform a predetermined operation to display on the display unit 21 (FIG. 2) a program list of registered programs that have been transmitted to the mobile terminal 11. The user may then identify a program to be deleted and provide deletion instructions. The basic block 40-1 to 40-7 (FIG. 22) of the UIM 12 where the program to be deleted is stored may be determined. In addition, a deletion request that includes specification of the particular basic block 40 may be transmitted from the mobile terminal 11 to the user information storage unit 51 of the distribution management server 16A (step S211).

Upon receipt of the deletion request, the user information storage unit 51 may send a deletion permission notice to the UIM 12 (step S212). The UIM 12 may delete the program specified by the user in step S211 from the basic block 40 upon receipt of the deletion permission notice. In addition, the UIM 12 may send a deletion end notice to the user information storage unit 51 (step S213). As a result, the user information storage unit 51 may delete the information on the corresponding program under the control of the transmission control unit 61. The user information storage unit 51 may also give a deletion notice to the contents server 19. In addition, the user information storage unit 51 may notify the mobile terminal 11 that the deletion is complete by transmitting a program list, thereby ending the process (step S214).

[2.3.1.6.1] The Case in which the Program Deletion from Basic Block is Carried Out at the Same Time Under the Guidance of the Distribution Management Server.

A program may be deleted from the basic blocks 40-1 to 40-7 (FIG. 21) at the same time the program is deleted from the user information storage unit 51 under the guidance of the distribution management server 16A. To perform this process, the user information storage unit 51 of the distribution management server 16A may send a deletion instruction to the UIM 12. The deletion instruction may specify the program requested to be deleted. The deletion instruction may be sent in place of the process of steps S211 and S212 previously described with reference to FIG. 30.

[2.3.1.7] The Case in which Use of a User Information Storage Unit is Prohibited.

A deactivation process for the user information storage unit 51 can be executed for preventing the user from using the user information storage unit 51. The deactivation process for the user information storage unit 51 may be executed, for example, when the distribution management server 16A stops the service temporarily. Another example is when the service of the distribution management server 16A to the user is temporarily suspended at the request of the contents provider operating the contents server 19. Once the deactivation process for the user information storage unit is performed, the distribution of the programs registered in the user information storage unit 51 to the UIM 12 is prohibited. In addition, the deletion of the programs registered in the UIM 12 is prohibited.

Figure 31:
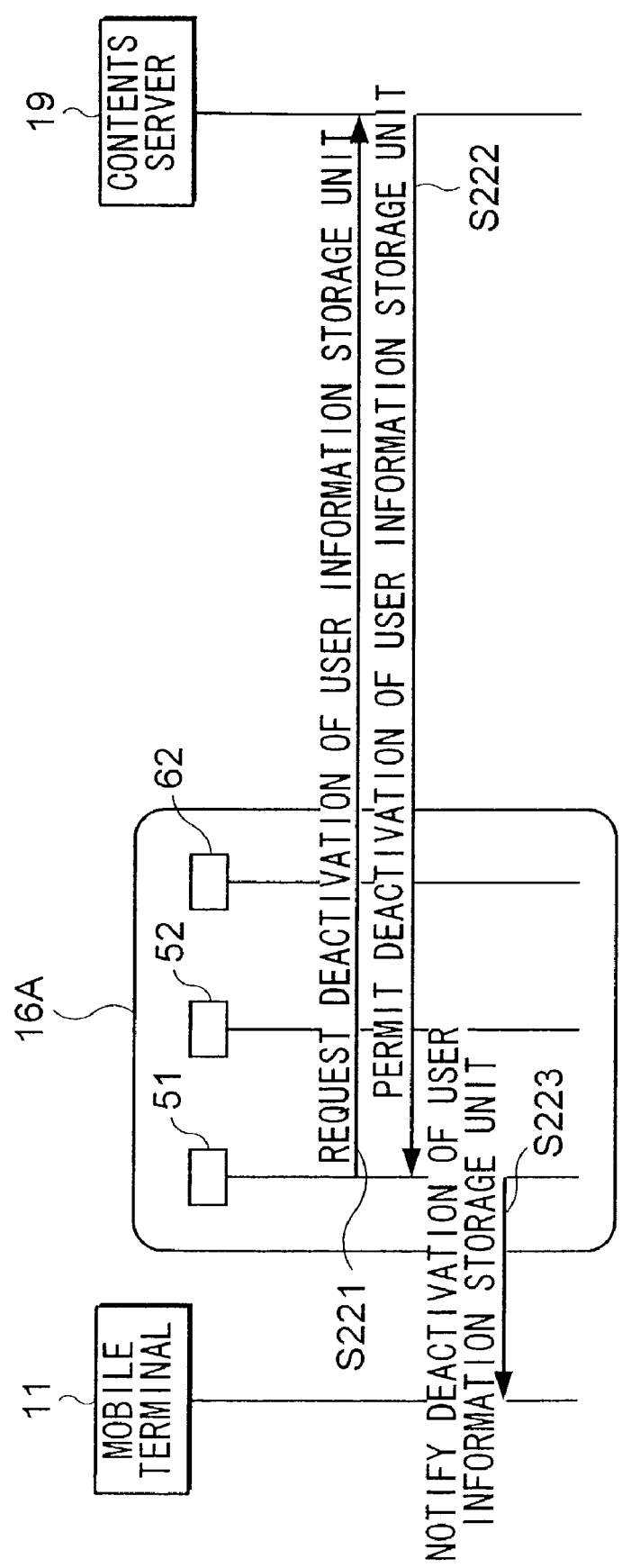
FIG. 31 is a sequence diagram showing the deactivation process for a user information storage unit in the program distribution system illustrated in FIG. 21.

FIG. 31 is an example of the deactivation process for the user information storage unit 51. In the following example, the contents server 19 requests the deactivation process for the user information storage unit. In other examples, other scenarios may elicit the deactivation process.

In FIG. 31, the contents server 19 may send a user information storage unit deactivation request to the user information storage unit 51 of the distribution management server 16A (step S221). The user information storage unit 51 may receive the user information storage unit deactivation request. Following receipt, the user information storage unit 51 may be prohibited from use (deactivated state). In addition, the user information storage unit 51 may send a user information storage unit deactivation permission notice to the contents server 19 (step S222). The user information storage unit 51 may then send to the mobile terminal 11 a user information storage unit deactivation notice. The user information storage unit deactivation notice effectively prohibits use of the user information storage unit 52 (step S223). As a result, the user of the mobile terminal 11 can confirm that use of the user information storage unit 51 has been prohibited.

[2.3.1.7.1] The Case in which the User Information Storage Unit is Deactivated by Distribution Management Server When the user information storage unit 51 is deactivated by the distribution management server 16A by itself, the user information storage unit 51 is prohibited from use (deactivated). As a result, the user information storage unit 51 may send a user information storage unit deactivation notice to the mobile terminal 11 indicating that the use of the user information storage unit 51 is prohibited (step S223).

[2.3.1.8] The Case in which the Use of the Program Stored in UIM Basic Block is Prohibited FIG. 32 is an example operation illustrating the process for deactivation of a basic block 40 (FIG. 21). Following the deactivation process, the use of a program stored in the basic blocks 40-1 to 40-7 or the free basic block 40-F1 of the UIM 12 may be prohibited. The deactivation process may be carried out under certain conditions, such as when the mobile terminal 11 is stolen, or the contents provider requests that a user be prohibited from using a program. Once the deactivation process is carried out, the user may be prohibited from using the programs stored in the basic blocks 40 (including the free basic block) involved. The description that follows deals with the case in which a contents server 19 that is in charge of user services takes action to request the process for deactivating the basic blocks 40 of a UIM 12 based on a report from the user.

FIG. 32 shows an example sequence of the deactivation process for the basic blocks 40. First, the contents server 19 may send a basic block deactivation request to the user information storage unit 51 of the distribution management server 16A (step S231). The user information storage unit 51, upon receipt of the basic block deactivation request, may send a deactivation instruction to the UIM 12 (step S232). As a result, the UIM 12 may deactivate the basic blocks 40 as instructed in the basic block deactivation request. In addition, the UIM 12 may give a basic block deactivation response indicating that the use of the basic blocks 40 identified in the deactivation instruction has been prohibited (step S233). The user information storage unit 51 may then give a basic block deactivation end notice to the contents server 19 (step S234). The basic block deactivation end notice may indicate that use of the basic blocks of the UIM 12 has been prohibited. Further, the user information storage unit 51 may give a user information storage unit list to the mobile terminal 11. The user information storage unit may indicate that the use of the basic blocks (which may include the free basic block) is prohibited, thereby ending the process (step S235).

[2.4] Effects of Second Embodiment

As described above, according to the second embodiment, programs can be distributed beyond the limit of the storage areas of the storage module (UIM), and the operating convenience on the part of the user is improved. The distribution management server 16A can manage the activation/deactivation of the distributed program. In addition, the distribution management server 16A may manage distribution and activation/deactivation of a program ready for distribution.

[3] Modifications of Embodiments

[3.1] First Modification

The foregoing description deals with the case in which a single distribution management server is involved. Nevertheless, a plurality of distribution management servers can be provided for the distributed processing. In such a case, the programs stored in each UIM and the information on the storage area of each program can be stored in a common database.

[3.2] Second Modification

In addition to the previous examples in which the distribution management server may be connected directly to a line switching network, the distribution management server can also be connected to the line switching network through the Internet. The Internet may include a packet switching network and an Internet gateway.

[3.3] Third Modification

Although only the UIM is described above as a storage module, the invention is also applicable to various IC card memories with equal effect. In this case, the storage module can be arranged at a fixed terminal as well as at a mobile terminal.

While various embodiments of the invention have been described, it will be apparent to those of ordinary skill in the art that many more embodiments and implementations are possible that are within the scope of the invention. Accordingly, the invention is not to be restricted except in light of the attached claims and their equivalents.

The invention claimed is:

1. A program distribution system for distribution of a program, the program distribution system comprising:
   a mobile terminal configured to receive a program wirelessly transmittable to the mobile terminal in a non-activated and encrypted condition,
   the mobile terminal comprising a user identification module and a first operational control unit configured to control operation of the mobile terminal, the first operational control unit further configured to transfer the program in the non-activated and encrypted condition to the user identification module in response to receipt of the program at the mobile terminal; and
   the user identification module comprising a plurality of memory blocks, and a second operational control unit configured to control operation of the user identification module, the second operational control unit further configured to decrypt the program and store the program in a non-activated condition in one of the memory blocks.

2. The program distribution system of claim 1, wherein the user identification module is configured to receive location information indicative of the one of the memory blocks the program is to be stored within, the location information transmittable to the mobile terminal and transferable to the user identification module.

3. The program distribution system of claim 1, wherein the mobile terminal is configured to transmit a request for distribution of the program to the mobile terminal.

4. The program distribution system of claim 1, wherein the program storable by the user identification module is only activatable by the user identification module in response to receipt by the user identification module of a program activation request that is transmittable to the mobile terminal.

5. The program distribution system of claim 1, wherein the program storable by the user identification module is only deactivatable by the user identification module in response to receipt by the user identification module of a program deactivation request transmittable to the mobile terminal.

6. The program distribution system of claim 1, wherein the program storable by the user identification module is only deleteable by the user identification module in response to receipt by the user identification module of a program deletion request transmittable to the mobile terminal.

7. The program distribution system of claim 1, wherein the one of the memory blocks is configured to securely store value data in conjunction with the program, wherein the user identification module is directable to execute the program to apply the value data to a monetary debt that is incurred with the mobile terminal.

8. The program distribution system of claim 1, wherein each of the memory blocks comprises a program area and a data area, the user identification module configured to store the program in the program area of the one of the memory blocks and data associated with the program in the data area of the same one of the memory blocks.

9. The program distribution system of claim 8, wherein the user identification module is configured to selectively make at least one of the program and the associated data storable in the one of the memory blocks accessible by another program storable and executable in another memory block.

10. A mobile terminal for use in distributing a program, the mobile terminal comprising:
a first operational control unit and a storage unit, the operational control unit configured to control operation of the mobile terminal based on a control program included in the storage unit;
a communication unit configured to receive a program wirelessly transmittable to the mobile terminal in a non-activated and encrypted condition;
a user identification module interface unit in communication with the communication unit, the communication unit configured to transfer the program in the non-activated and encrypted condition to the user identification module interface unit;
a user identification module coupled with the user identification module interface unit, the user identification module interface unit is configured to transfer the program in the non-activated and encrypted condition to the user identification module; and
the user identification module comprises a plurality of memory blocks and a second operational control unit configured to control operation of the user identification module, the second operational control unit further configured to decrypt the program and store the program in a non-activated condition in one of the memory blocks.

11. The mobile terminal of claim 10, wherein the communication unit is further configured to receive location information that is wirelessly transmittable to the mobile terminal, the location information is indicative of the one of the memory blocks the program is to be stored within, and wherein the location information is transferable from the communication unit to the user identification module via the user identification module interface unit to indicate to the user identification module where the decrypted program is to be stored.

12. The mobile terminal of claim 10, further comprising a display section in communication with the first operational control unit and the communication unit, wherein a request for distribution of the program to the mobile terminal is transmittable with the communication unit as directed by the first operational control unit in conjunction with the display section.

13. The mobile terminal of claim 10, wherein the user identification module interface unit is configured to communicate directly with the operational control unit to transmit and receive data, and wherein the user identification module interface unit is further configured to communicate directly with the communication unit to transmit and receive data without intermediation of the first operational control unit.

14. The mobile terminal of claim 13, further comprising an external equipment interface configured to exchange information with a communication device that is external to the mobile terminal, wherein the user identification module interface unit is further configured to communicate directly with the external equipment interface to exchange information with the communication device without intermediation of the first operational control unit.

15. The mobile terminal of claim 10, wherein the program storable by the user identification module is only activatable by the user identification module in response to receipt by the user identification module of a program activation request that is transmittable to the communication unit and receivable by the user identification module via the user identification module interface unit.

16. The mobile terminal of claim 10, wherein the program storable by the user identification module is only deactivatable by the user identification module in response to receipt by the user identification module of a program deactivation request that is transmittable to the communication unit and receivable by the user identification module via the user identification module interface unit.

17. The mobile terminal of claim 10, wherein the program storable by the user identification module is only deleteable by the user identification module in response to receipt by the user identification module of a program deletion request that is transmittable to the communication unit and receivable by the user identification module via the user identification module interface unit.

18. The mobile terminal of claim 10, wherein the one of the memory blocks is configured to securely store value data in conjunction with the program, and wherein the user identification module is directable to execute the program to apply the value data to a monetary debt that is incurred with the mobile terminal.

19. The mobile terminal of claim 10, wherein each of the memory blocks comprises a program area and a data area, and the user identification module is further configured to store the program in the program area of the one of the memory blocks and data associated with the program in the data area of the same one of the memory blocks.

20. The mobile terminal of claim 19, wherein the user identification module is further configured to selectively make at least one of the program and the associated data storable in the one of the memory blocks accessible by another program storable and executable in another one of the memory blocks.

21. The mobile terminal of claim 10, wherein the user identification module is configured to decrypt the program with a user identification module private key stored in the user identification module.

22. The mobile terminal of claim 10, wherein the user identification module is configured to control access by the program to other memory blocks.

* * * * *